US009641345B2

(12) United States Patent
Cross et al.

(10) Patent No.: US 9,641,345 B2
(45) Date of Patent: May 2, 2017

(54) INTEGRATED COMMUNICATION SYSTEM AND METHOD

(75) Inventors: Jason Cross, Ipswich (GB); Alex Westley, Ipswich (GB)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 84 days.

(21) Appl. No.: 13/148,652

(22) PCT Filed: Feb. 9, 2010

(86) PCT No.: PCT/GB2010/050202
§ 371 (c)(1),
(2), (4) Date: Nov. 21, 2011

(87) PCT Pub. No.: WO2010/092378
PCT Pub. Date: Aug. 19, 2010

(65) Prior Publication Data
US 2012/0059922 A1   Mar. 8, 2012

(30) Foreign Application Priority Data

Feb. 10, 2009   (GB) .................................. 0902152.8

(51) Int. Cl.
*G06F 15/173*   (2006.01)
*H04L 12/14*   (2006.01)
(Continued)

(52) U.S. Cl.
CPC .......... *H04L 12/14* (2013.01); *H04L 12/5895* (2013.01); *H04L 51/38* (2013.01);
(Continued)

(58) Field of Classification Search
USPC ................................... 709/217, 223
See application file for complete search history.

(56) References Cited

U.S. PATENT DOCUMENTS 5,873,034 A * 2/1999 Alperovich et al. ....... 455/432.3
2005/0055292 A1   3/2005 Kissner et al.
(Continued)

FOREIGN PATENT DOCUMENTS

EP   1111897 A2   6/2001
EP   1128695 A1   8/2001
(Continued)

OTHER PUBLICATIONS

PCT International Search Report dated Aug. 11, 2010 in re PCT Application No. PCT/GB2010/050202, 6 pages.
(Continued)

*Primary Examiner* — Joseph E Avellino
*Assistant Examiner* — Marshall McLeod
(74) *Attorney, Agent, or Firm* — Tucker Ellis LLP

(57) ABSTRACT

There is described herein a method and apparatus for providing a telecommunications link between a first user and a second user in a telecommunications network. A request is received from the first user to provide a telecommunications link to the second user. The system then determines from a server hosting a networked community of users in which users interact over a communications network independent of the telecommunications network whether the first user and the second user have a specified relationship in the community of users. At least one setting for the telecommunications link is specified based on whether the first user and the second user have a specified relationship in the community of users.

20 Claims, 13 Drawing Sheets

(51) Int. Cl.
  *H04L 12/58* (2006.01)
  *H04L 29/08* (2006.01)
  *G06Q 50/00* (2012.01)

(52) U.S. Cl.
  CPC ............ *H04L 67/02* (2013.01); *H04L 67/306* (2013.01); *G06Q 50/01* (2013.01)

(56) References Cited

U.S. PATENT DOCUMENTS

| | | | |
|---|---|---|---|
| 2007/0255807 A1* | 11/2007 | Hayashi et al. ............... | 709/219 |
| 2008/0112548 A1* | 5/2008 | Alexander ........ | H04M 3/42161 |
| | | | 379/114.06 |
| 2009/0042564 A1* | 2/2009 | Zabawskyj ........... | H04W 40/02 |
| | | | 455/433 |
| 2009/0080635 A1* | 3/2009 | Altberg ................. | G06Q 30/02 |
| | | | 379/216.01 |

FOREIGN PATENT DOCUMENTS

| | | |
|---|---|---|
| EP | 1199852 A1 | 4/2002 |
| JP | 2002-032510 | 1/2002 |
| WO | 9907167 A1 | 2/1999 |
| WO | 2006135285 A2 | 12/2006 |
| WO | 2007091238 A2 | 8/2007 |
| WO | 2008019462 A2 | 2/2008 |

OTHER PUBLICATIONS

Great Britain Search Report dated Jun. 8, 2009 in re GB Patent Application No. GB0902152.8, 2 pages.

Nanavati, et al., "Analyzing the Structure and Evolution of Massive Telecom Graphs", IEEE Transactions on Knowledge and Data Engineering, IEEE Service Center, Los Alamitos, CA US, vol. 20, No. 5, May 1, 2008, 16 pages.

International Preliminary Report on Patentability dated Aug. 16, 2011 for Application No. PCT/GB2010/050202, 12 pages.

* cited by examiner

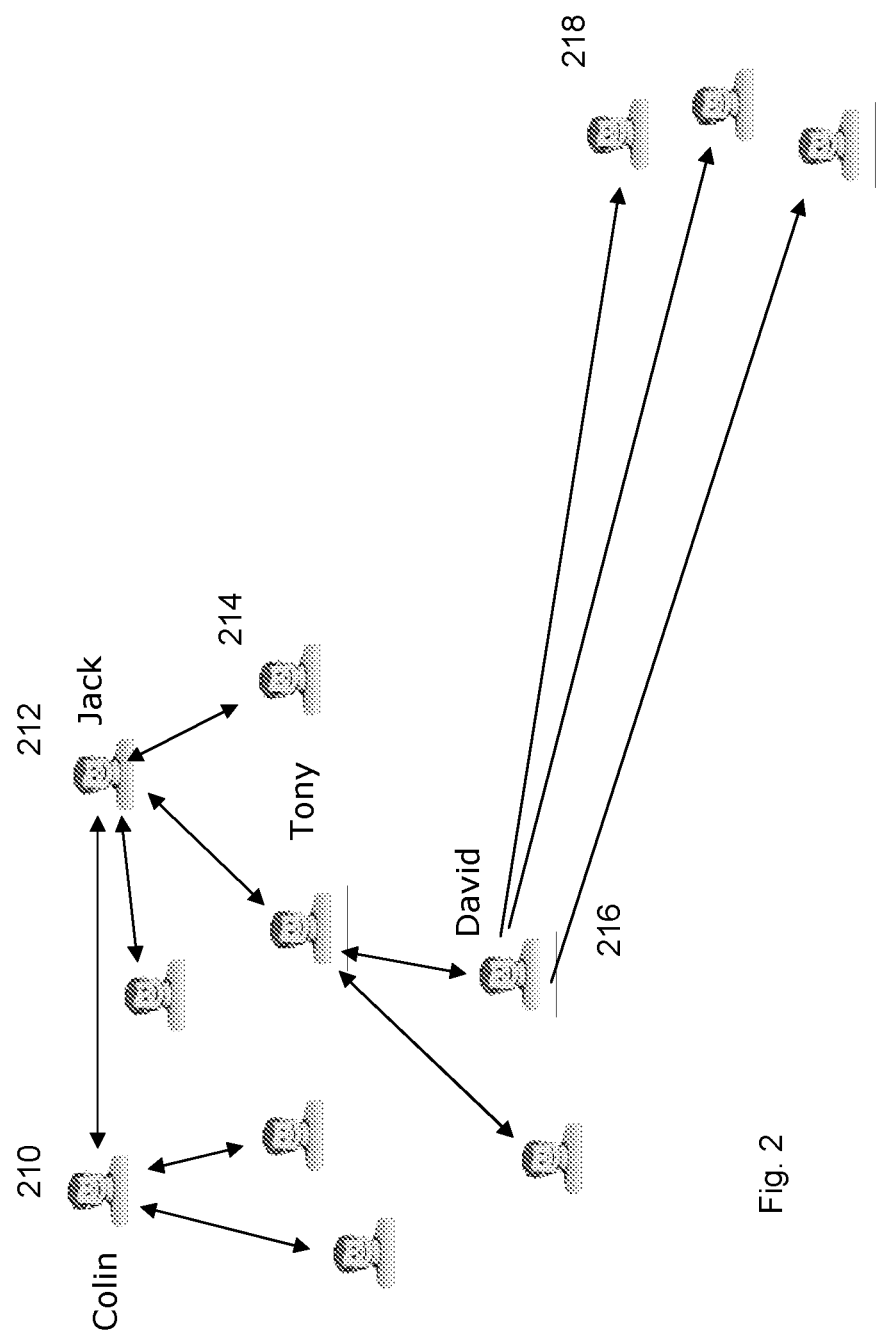

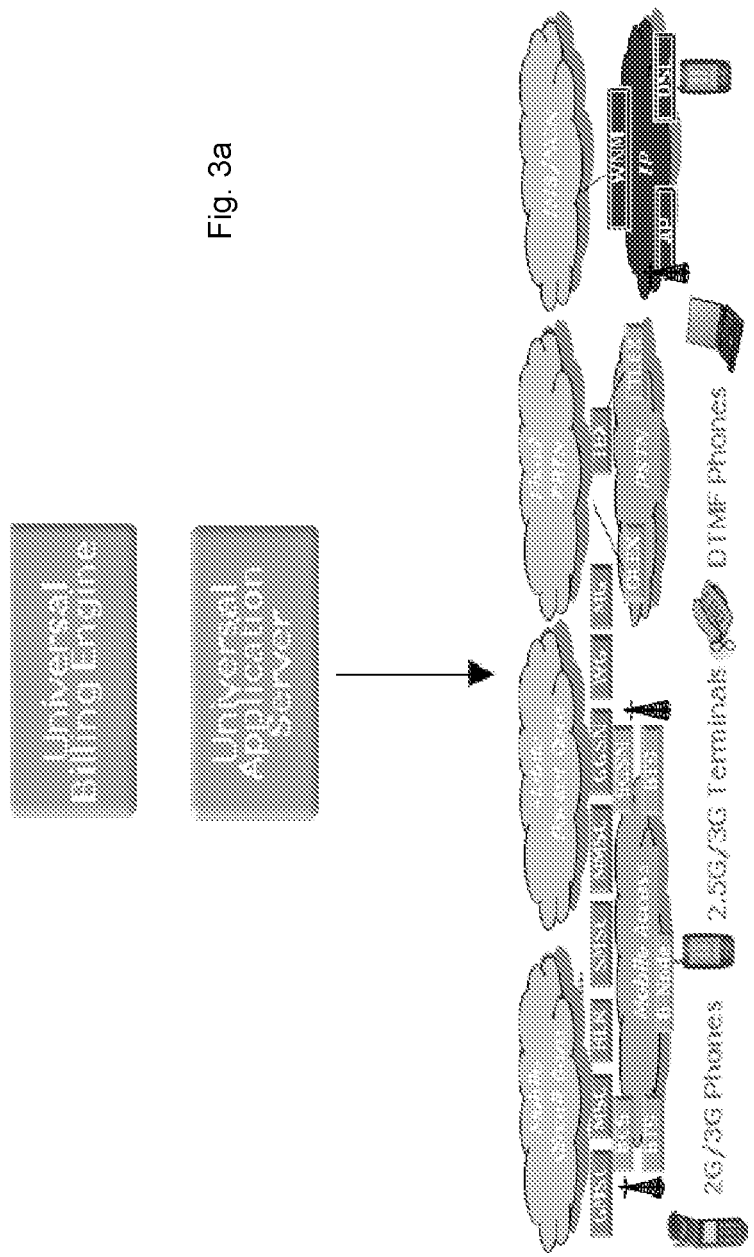

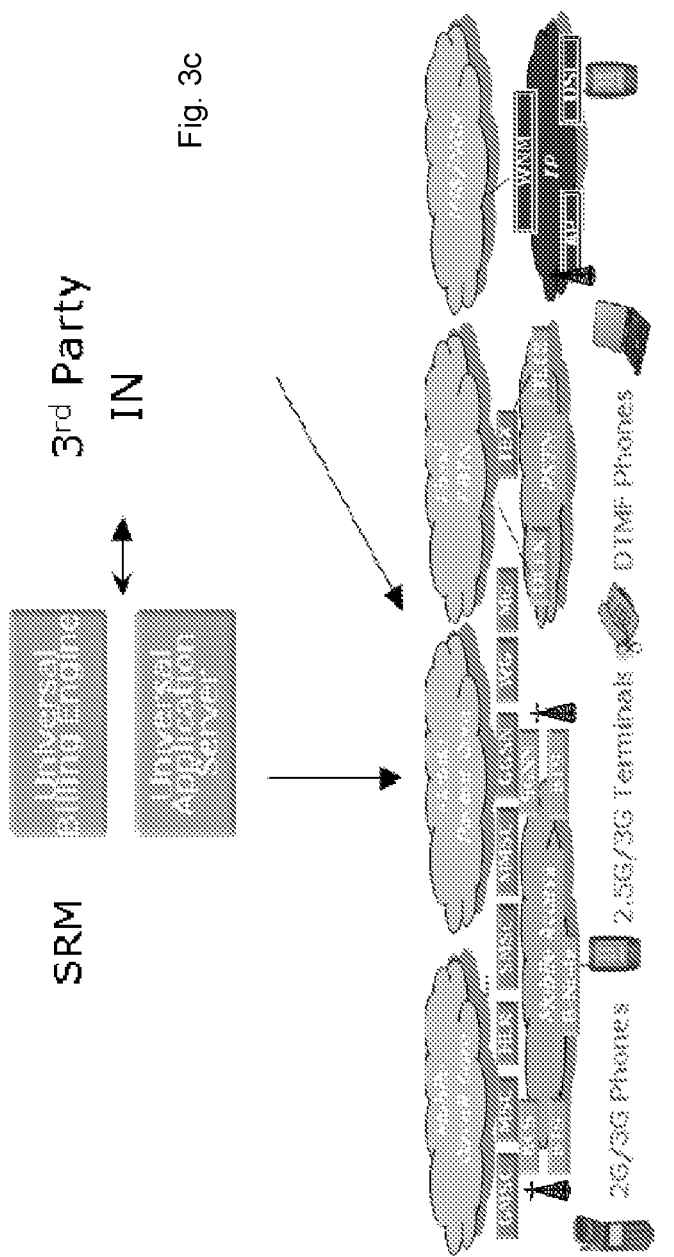

INTEGRATED COMMUNICATION SYSTEM AND METHOD

The invention relates to the field of managing connections between users in a network or across a plurality of networks, in particular the invention relates to managing connections in one network that can then be utilised in a second network.

Users connect with friends and contacts via multiple different channels and over different types of networks. In some of these channels, a user can set up a network of connections to other users so that interaction between connected users may be treated differently to those between users that are not connected. However, not all networks offer this functionality and it can be time consuming and difficult for a user to replicate his network connections across all of the different channels.

Even if a user does put in the necessary time and investment to connect to each of his contacts over the various different networks, the connections that are established are only one-way connections. Each of his contacts must also set up a separate connection back to the originating user.

This problem is particularly acute in mobile telephone networks in which it can be possible to access reduced tariffs if a friend link is set up to friends on the same network. However, it is very difficult to know which of your friends are on the same network and therefore could benefit from the setup of a friend link. It is also time consuming to register friends for the reduced tariffs and it is difficult to keep this registration list up to date as users change their service providers.

At the same time, network providers can use call data records to access information relating to their own users. However, although these users contact other off-network users that belong to competing network providers, it is very difficult for the home network provider to gather or access any data relating to off-network users. In particular, it is difficult for network providers to identify or contact off net users in a targeted manner.

According to one aspect, there is provided a method of providing a telecommunications link between a first user and a second user in a telecommunications network, the method comprising: receiving a request from the first user to provide a telecommunications link to the second user; determining from a server hosting a networked community of users in which users interact over a communications network independent of the telecommunications network whether the first user and the second user have a specified relationship in the community of users; and specifying at least one setting, parameter or characteristic for the telecommunications link based on whether the first user and the second user have a specified relationship in the community of users.

The networked community of users may be in the form of a social networking community managed by a social networking service, preferably in which users interact, communicate and specify relationships via one or more social networking interfaces, including, for example, a social networking website or social networking client software. The social networking service preferably allows for interaction and communication between users via communication channels (e.g. the Internet) which are separate from and independent of the telecommunications network and/or allows for interaction and communication independently of any telecommunications services to which the users are subscribed. The term telecommunications link preferably encompasses any type of telecommunications interaction between users, including, for example, audio and video calls and messaging (e.g. SMS/MMS).

Advantageously, specified relationships that have already been formed in the community and are hosted in the communications network can be applied in the telecommunications network and used to vary settings in that network. Hence a user does not have to set up separate relationships to the same users in the telecommunications network where these relationships already exist in the first communications network. Instead, the method can just use the existing connections from the communications network.

Preferably, the request from the first user includes an MSISDN (Mobile Subscriber Integrated Services Digital Network Number) identifier for the second user in the telecommunications network.

In one embodiment, the request from the first user comprises a call setup connection request for a connection to the second user in the telecommunications network. That is, the request to provide the link may be implicitly provided when the first user calls the second user in the telecommunications network in the normal way. The call may be a voice, video and/or data call.

In one embodiment, the request from the first user comprises a message transmission request for transmission of a message to the second user in the telecommunications network. For example, the first user may submit an SMS to the telecommunications network for transmission to the second user. This is at least an implicit request for a telecommunications link in the telecommunications network.

In a highly preferred embodiment, specifying at least one setting for the telecommunications link comprises specifying a billing policy for the telecommunications link.

Preferably, the specified relationships in the community of users are two-way relationships. That is, if users are 'friends' in the community, the first user has a relationship with the second user and the second user has an equal and opposite relationship with the first user. Therefore, the system can automatically set up a two-way relationship so that only one user needs to make the relationship in the communications network, but both benefit when either requests a telecommunications link.

In a preferred embodiment, the method further comprises receiving from the server information identifying at least one specified relationship between two users in the networked community of users and caching the information. The server preferably sends out periodic updates as relationships are formed in the communications network. These can be stored in a local database in the telecommunications network. Therefore, the local database has a store that mirrors the relationships created in the communications network.

Preferably, determining from a server whether the first user and the second user have a specified relationship comprises retrieving from the cache information relating to at least one specified relationship. Looking up information locally stored in a cache is faster and more efficient that relying on calls to an external server to verify each relationship before making a connection in the telecommunications network.

Alternatively, determining from a server whether the first user and the second user have a specified relationship may include sending a request to the server including an identifier of the first user and an identifier of the second user. That is, the information may be obtained from the networked community in the communications network. This may ensure that the information relating to relationships in the community of users is up to date before connections are formed in the telecommunications network. This step may be used in addition to the preceding feature of checking relationships in a cache. For example, if a relationship is not found in the cache, the server may be queried directly to check that no relationship exists in the user community.

Preferably, the steps of determining whether there is a specified relationship and selecting at least one setting are performed before the telecommunications link is formed between the first and the second user. However, in an alternative embodiment, the telecommunications link is first formed and the relationship is checked and the setting determined accordingly at a later stage. This may be helpful, for example if a billing rate can be calculated after setup of the telecommunications link, since it minimises the delay in the initial setup of the link between the users. For example, by default, users may be billed at the full rate for the telecommunications link and an adjustment to the billing rate may be applied if a relationship is found between the users once the link has been established. In a further variation, the relationship may be checked and the setting determined after completion/termination of the telecommunications link (e.g. after termination of a call or after a text message has been delivered), e.g. if billing calculation is performed off-line based on call records. Thus the term "setting" is not limited to operational characteristics of an active communications link, but encompasses any parameter or characteristic used in processing the link, whether during the link or afterwards.

In one embodiment, the telecommunications link comprises a message transmission path, for example for an SMS or an MMS message. Alternatively the telecommunications link may comprise a voice or data link, for example for a telephone conversation.

Preferably, the communications network comprises an internetwork, in particular a packet switched network such as the internet. In particular, users may access the community of users via a web interface, for example on a social networking website. The telecommunications network preferably includes, at least in part, a mobile telecommunications network, for example a GPRS, CDMA, 3G or Wi-Fi network.

The method preferably further comprises receiving over the telecommunications network a request from the first user to form a connection with a third user in the community of users, the request including an identifier of the third user, and transmitting to the server a relationship request message to request establishment of a specified relationship in the community of users, the relationship request message including an identifier of the first user and an identifier of the third user. Hence the system enables the establishment of relationships between users in the community of users over the telecommunications network. The request may take the form of an SMS message from the first user to a short code specified by the network operator, preferably wherein the short code is reserved for the relationship requests.

Preferably, the identifier of the first user and the identifier of the third user comprise identifiers in the telecommunications network, in particular Mobile Subscriber ISDN Numbers (MSISDN) for the users. These numbers may be passed to the server hosting the networked community of users, for example for identification of the first and third users in the community.

Alternatively, or in addition, the identifier of the first user and the identifier of the third user may comprise identifiers in the community of users. These identifiers can be passed to the server for the community and, if the MSISDN numbers of the two users are available in the stored data in the community, they can be transmitted back to the telecommunications network.

In a highly preferred embodiment, the method further comprises providing at the server an application for managing communications with the telecommunications network. This management can include providing a communications interface between the server and the telecommunications network. The application can also be used to provide updates to a cache in the telecommunications network relating to relationships that have been formed in the community and to process relationship requests received from the telecommunications network.

In one embodiment, the method further includes receiving at the application a request from a first user to form a specified relationship to a third user in the community of users, the request including an identifier of the third user, and storing an identifier of the first user and the identifier of the third user as a specified relationship in the community of users. The request may be received from the first communications network, for example via a web interface, or may be received from the telecommunications network, for example in the form of an SMS or MMS message. The identifier of the first user and the identifier of the third user may comprise identifiers for the users in the telecommunications network, for example MSISDNs, or may comprise identifiers for the users in the community of users, for example user names in the community.

Preferably, the method further comprises providing at the server an application for providing an interface to enable users in the community of users to manage specified relationships with other users in the community. The interface may be a web-based interface. The community may already have an interface enabling users to manage relationships and communicate within the community, therefore, this additional application may simply add additional functionality to that interface, for example to link MSISDNs with usernames in the community (or extract them from existing user profiles) and transmit details of new relationships and relationship updates to the telecommunications network.

In one embodiment, the method includes receiving at the application a registration request from a user, the registration request including an identifier of the user in the telecommunications network and an identifier of the user in the community of users, and storing the identifiers in a database of registered users. Such registration requests may be required for users to join the service and to begin to use their specified relationships in the telecommunications network. As part of the registration process, user details, such as a user's name, MSISDN and existing relationships in the community may be stored at the application and optionally transmitted to the telecommunications network.

In one embodiment, the method further comprises receiving at the application an identifier for a group of users and storing the group identifier with an identifier of at least one user, the user being a member of the group. In this embodiment, the response from the server indicates whether the first user and the second user are members of the same group of users. The method may also include providing an interface to enable a group administrator to control the membership of the group.

In this embodiment, preferably, payment is requested for the telecommunications link from a first payment account if the first and second users are members of the group of users and payment is requested for the telecommunications link from a second payment account if the first and second users are not members of the group of users. In this way, a group account may be maintained wherein any communication between members of the group is billed to the group account, but any communication from a group member to another user outside the group is billed to the user's own account. This may be particularly useful, for example, to enable some calls from specific users to be billed to a corporate account, whereas calls to friends who are not part of the corporate group are automatically billed to the user's personal account. This may make management of business accounts easier whilst still enabling the user to make personal calls from the same telecommunications device.

Preferably, specifying at least one setting for the telecommunications link comprises selecting a billing policy for the telecommunications link and transmitting the billing policy to a network operator in the telecommunications network. The billing policy may include a per-minute billing rate for the link, which may be zero or greater, or a fixed one-off charge for the link, for example a fixed charge for transmitting an SMS or MMS message. The billing policy may also include an identifier of the account to which the charge should be applied.

Preferably, transmitting the billing policy to a network operator comprises transmitting the billing policy to a billing server in the telecommunications network. The billing server can then apply the relevant charge to the appropriate account.

Preferably, the method further includes determining a minimum payment amount required for the telecommunications link based on whether the first user and the second user have a specified relationship in the community of users. This minimum payment amount may be zero if the users have a specified relationship and the charge for a link (for example an SMS message) between users is zero. However, it is more likely that a minimum amount of credit will be required in the user account to enable the communication link to be established.

Preferably the method further comprises determining whether advance payment is required from a user account associated with the first user and whether a minimum payment amount is available in the user account and generating a message to indicate whether the telecommunications link is permitted or refused based on whether the minimum payment amount is available in the user account. For a post-payment (i.e. contract) user, where advance payment is not required, the communication link may be established without any credit check for the user and the telecommunications link may be automatically permitted.

The method preferably further includes generating a data record, the data record including at least one of: an identifier of the first user and/or the second user in the telecommunications network (e.g. MSISDNs for the users), an identifier of the network provider for the first user and/or the second user in the telecommunications network, an identifier of the type of telecommunications link requested between the first user and the second user (e.g. SMS, MMS, voice or data link), an indication of the length of time for which the first and second user are connected over the telecommunications link and an indication of the value ascribed to the telecommunications link for the telecommunications network (for example, the total amount charged for the communication link or the number of 'units' used in the connection).

Preferably, the method further includes analysing a plurality of data records to identify at least one user not associated with a selected network provider. That is, one network provider may request information about users belonging to other network providers. This information may include the number or value of all communications links made to those users in a specified time period. The network may also obtain identifiers for those users. This may enable network providers to gather information relating to users who are not registered on their networks, in particular usage information. This may enable providers to target advertising and offers to specific users to encourage them to switch networks and join the provider's own network. For example, a provider may target advertising towards off-net users who have a lot of 'friends' or relationships in the service provider's network by contacting the user to highlight that the user could make savings by switching network.

Similar analysis of usage information may also be useful for customers who are already part of a service provider's network. In particular, users who perform a lot of text messaging may be targeted with advertisements for contracts that include large text message bundles.

The method may comprise receiving in a first network a request from a first user to establish a connection to a second user, wherein the request comprises an identifier of the second user in the first network; retrieving an identifier for the second user in a second network; and establishing a connection between the first and the second user, wherein the connection is established at least in part over the second network. Preferably, the method comprises retrieving an identifier for the first user in the second network and establishing a connection between the first user and the second user in the second network. The identifier in the second network may comprise an MSISDN number for the user in the second network. The request from the first user preferably comprises at least one of: the selection of an identifier associated with the second user in the first network from a plurality of icons or a list of user identifiers; and the receipt of an identifier of the second user in the first network.

In a further aspect, the invention provides apparatus or a system for providing a telecommunications link between a first user and a second user in a telecommunications network, the apparatus or system comprising: means for receiving a request from the first user to provide a telecommunications link to the second user; means for determining from a server hosting a networked community of users in which users interact over a communications network independent of the telecommunications network whether the first user and the second user have a specified relationship in the community of users; and means for specifying at least one setting, parameter or characteristic for the telecommunications link based on whether the first user and the second user have a specified relationship in the community of users.

The invention further provides apparatus or a system for providing a telecommunications link between a first user and a second user in a telecommunications network, the apparatus or system comprising: an input interface for receiving a request from the first user to provide a telecommunications link to the second user; a processor operable to determine from a server hosting a networked community of users in which users interact over a communications network independent of the telecommunications network whether the first user and the second user have a specified relationship in the community of users; and a processor operable to specify at least one setting, parameter or characteristic for the telecommunications link based on whether the first user and the second user have a specified relationship in the community of users.

According to a further aspect, there is provided a method of managing connections between users in a networked community of users in which users interact over a communications network, the interactions including forming specified relationships between specific users in the community of users, the method comprising: receiving a notification of a new specified relationship formed between a first user and a second user in the community of users; determining an identifier for each of the first and second users in a telecommunications network separate to the communications network; identifying a service provider for at least one of the first and second users in the telecommunications network; and transmitting to at least one identified service provider information identifying the first and second users and indicating the formation of a specified relationship between the first and second user.

The method may be implemented by an application operating within the communications network, for example at a server in the communications network. The server has at least one interface via which it can connect to the telecommunications network and the method may further comprise providing the interface. It will be appreciated that this embodiment enables the system to advise the telecommunications network of new relationships that are formed in the community. The telecommunications network can then store this information in a cache and use this information efficiently to manage links in the telecommunications network.

According to a further aspect, there is provided a method of managing connections between users in a networked community of users in which users interact over a communications network, the interactions including forming specified relationships between specific users in the community of users, the method comprising: providing an interface to a telecommunications network separate to the communications network for providing direct telecommunications links between users; receiving a query from the telecommunications network, the query identifying a requested communication link between first and second user; extracting from the query an identifier of the first and second user; analysing the identifiers of the first and second users to determine whether a specified relationship exists between the first and second users in the community of users; and transmitting to the telecommunications network a reply message indicating whether a specified relationship exists between the first and second users in the community of users.

In this aspect, an application is provided at a server and may respond in real-time to requests from a telecommunications network to determine whether a specified relationship exists between two parties. This can be used to ensure that the most up to date information is used when communication links are formed in the telecommunications network.

In a further aspect of the invention, there is provided a method of processing communication interactions between users of a telecommunications network in accordance with relationships defined between users in a social networking service community, comprising: processing a telecommunication interaction via the telecommunications network between first and second users of the telecommunications network; receiving social networking relationship data relating to a relationship (defined) between the first and second user in the social networking service community; and performing processing relating to the telecommunication interaction in dependence on the social networking relationship data.

The telecommunication interaction may, for example, be a voice or video call, or a text or picture message. The social networking service community may be managed by one or more servers. Receiving relationship data may comprise requesting the data from a server associated with the social networking service, or the data may be received from a cache of relationship data as described elsewhere herein. The processing relating to the telecommunication interaction may comprise billing-related processing, e.g. to determine call costs for the interaction (or may alternatively relate to handling of the telecommunication interaction itself). The relationship data may specify that a relationship is defined between the users or may specify one or more relationships defined between the users or may specify that there is no defined relationship between the users in the social networking community. This method aspect may be combined with other method aspects and features set out herein.

In a further aspect, there is provided apparatus or a system for managing connections between users in a networked community of users in which users interact over a communications network, the interactions including forming specified relationships between specific users in the community of users, the apparatus or system comprising: means for receiving a notification of a new specified relationship formed between a first user and a second user in the community of users; means for determining an identifier for each of the first and second users in a telecommunications network separate to the communications network; means for identifying a service provider for at least one of the first and second users in the telecommunications network; and means for transmitting to at least one identified service provider information identifying the first and second users and indicating the formation of a specified relationship between the first and second user.

In a further aspect, there is provided apparatus or a system for managing connections between users in a networked community of users in which users interact over a communications network, the interactions including forming specified relationships between specific users in the community of users, the apparatus or system comprising: means for providing an interface to a telecommunications network separate to the communications network for providing direct telecommunications links between users; means for receiving a query from the telecommunications network, the query identifying a requested communication link between first and second user; means for extracting from the query an identifier of the first and second user; means for analysing the identifiers of the first and second users to determine whether a specified relationship exists between the first and second users in the community of users; and means for transmitting to the telecommunications network a reply message indicating whether a specified relationship exists between the first and second users in the community of users.

In a further aspect, the invention provides apparatus or a system for processing communication interactions between users of a telecommunications network in accordance with relationships defined between users in a social networking service community, comprising: means for processing a telecommunication interaction via the telecommunications network between first and second users of the telecommunications network; means for receiving social networking relationship data relating to a relationship between the first and second user in the social networking service community; and means for performing processing relating to the telecommunication interaction in dependence on the social networking relationship data.

More generally, apparatus aspects corresponding to any method aspects described above are also provided and the preferred method features may also be implemented in the apparatus. In particular, a network device or cluster of interlinked network devices may be used to implement the methods set out above, or the methods may be implemented in a plurality of processors over a network, for example the internet. Database(s) are also implemented in the servers or in separate database servers to store the data described. User terminals are also provided that enable a user to interface and interact with the described methods and to view an interface for the system. The invention also provides computer program, computer program product and computer readable medium aspects corresponding to the method aspect and features described.

Embodiments of the systems and methods will now be described with reference to the drawings in which:

FIG. 2 is a schematic diagram of a relationship model according to an alternative embodiment;

FIG. 3a is a schematic diagram of a global architecture for a prepaid system according to one embodiment;

FIG. 3c is a schematic diagram of a global architecture for a stand-alone system according to one embodiment;

A description of one embodiment of an implementation of the systems and methods described herein is set out below. This description sets out one way in which the system may be implemented and is not intended to be limiting in any way.

There are two distinct configurations for implementation of the Social Relationship Manager (SRM). The first is called the Eclipse model. All subscribers that are added to a community group of subscribers receive a preferential tariff or discount when calling other group members from within this community group.

The Eclipse model has a wide potential. There are many forms of community groups such as schools, football clubs, societies, universities, work or social places, interests or hobbies. Furthermore, the SRM may be used for businesses, such as SMEs (small or medium size enterprises). Groups of employees can call each other to receive the community group benefits described below; however the SRM can also be used as a way to provide a Closed User Group (CUG) service, whereby it is even possible to charge for these calls from a business wallet so that the employee does not personally pay for intra-business calls. Furthermore, if an operator becomes a Mobile Virtual Network Enabler (MVNE), or wants to target a specific segment in the market place such as the youth segment, then the SRM Eclipse model could even be used to create micro-MVNOs (Mobile Virtual Network Operators).

Figure 1:
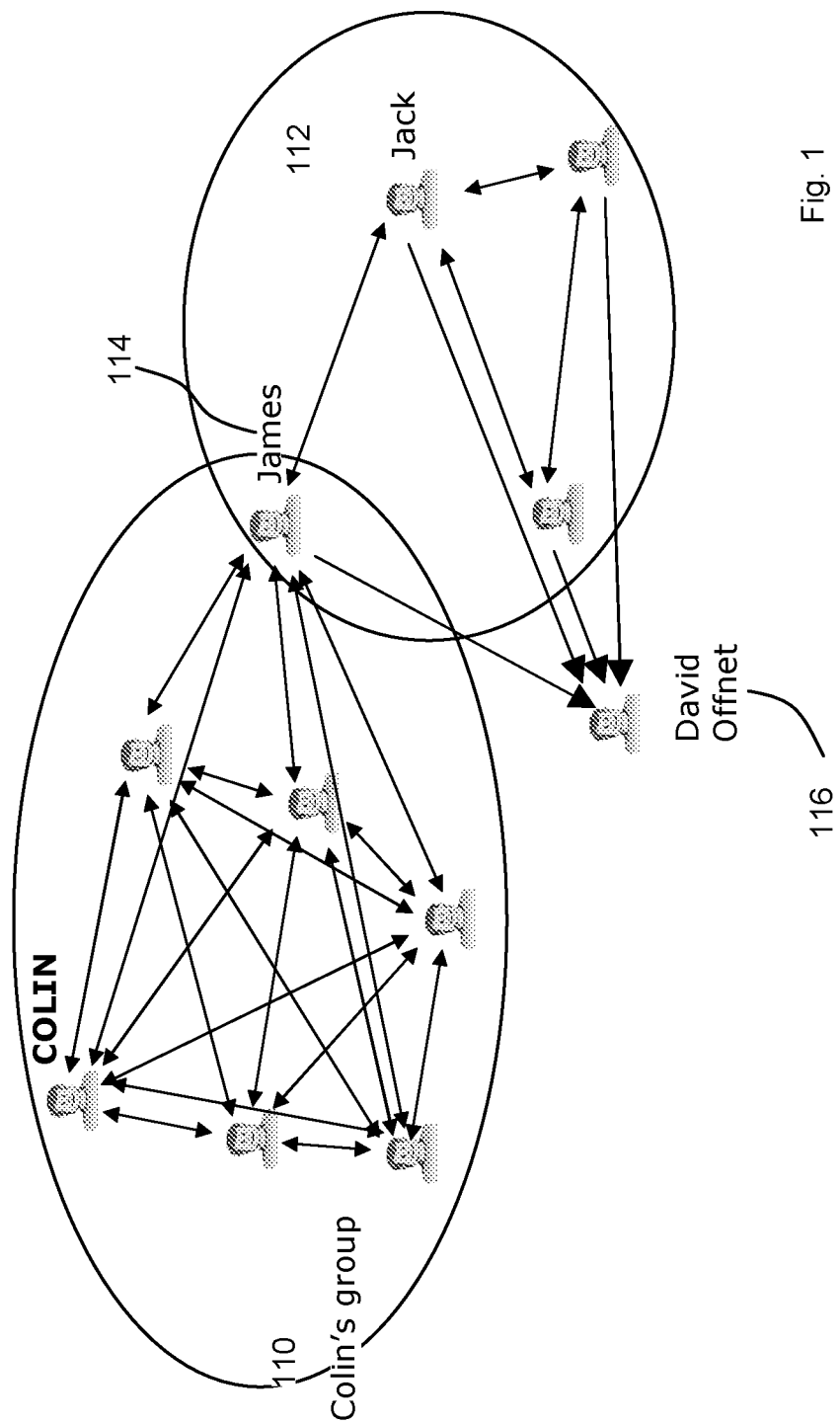
FIG. 1 is a schematic diagram of a relationship model according to one embodiment.

The Eclipse relationship model is illustrated schematically in FIG. 1, which illustrates links between users:

The first group of relationships is a community group named 'Colin's Group' 110. There are 7 members. The arrows signify a relationship between any of the members, for instance when any one of these members calls any other member in Colin's group. A second community group named 'Jack' is also illustrated 112. There are 4 members. As above, there is a relationship between each of these users. One of the members, James 114, is a member of both the 'Jack' 112 and 'Colin' 110 group. In this scenario, James 114 has a relationship with members in both groups. All of the subscribers that we have seen from the 2 groups created are all on-net subscribers. David 116, however, is from a different network and as such is termed an off-net subscriber. The SRM has the ability to add off-net subscribers to community groups, but the relationship is one-way demonstrated by the single direction arrow. That is to say that when a member from the 'Jack' group 112 calls David 116, they will receive a discount or tariff as defined by the operator. When David 116 calls any member from the 'Jack' group 112, he is charged as per his pricing plan defined with his off-net operator without any discount.

The second type of model that is recognised is that of the Atomic model. This model is based upon the ever-increasing popularity of social networking sites such as Facebook. First, user A sends a 'friend request' to user B. When user B receives the 'friend request' he has the option to either accept or ignore. In the scenario where a friend request is accepted, a direct relationship link is created between the 2 users. The outcome of this, amongst many, is that they can firstly see each others profiles, but secondly that they can communicate with each other. The Atomic model aims to create direct relationship links between subscribers so that when they call each other, they receive a special discount or alternative tariff, amongst many other features later to be explained. The Atomic model creates strong bonds between users in which it is possible to leverage many benefits from these relationships.

The Atomic model is illustrated schematically in FIG. 2. Three subscribers have a 'friend' relationship link with Colin 210, therefore he has direct links with these 3 subscribers. Whenever they call each other, an alternative friend link tariff or discount is applied. The 'friend' relationships for Jack 212 are also shown. He has 4 direct links with his friends. Tony 214 has 3 direct friend relationships. All of the above relationships are with on-net subscribers only. David 216 has a direct relationship with one on-net subscriber. When David 216 calls Tony 214, an on-net friend tariff is applied. But it is also possible to have friend relationships with subscribers from other networks. When David 216 calls for example subscriber 218, then an off-net friend tariff is applied. This is an off-net friend link relationship.

The Eclipse model and Atomic model may be combined, to allow management of both groups and friend links, with associated tariffs/billing policies and the like.

Though a bespoke, independent SRM solution may be provided implementing the above models, as described in more detail below, the SRM may alternatively or additionally interface with existing, external social networking services (e.g. Myspace, Facebook, Twitter) and obtain relationship data from those services, for example defining friend links, group memberships, follower relationships and the like (Facebook, for example, may provide both friend link information and group information). Tariffs/billing policies may then be determined based on the user relationships/groups defined in those external social networking services.

The interface to external services may include a user application which can be added to a user's profile in the social networking service (e.g. in Facebook) and/or relevant proprietary or open social networking APIs (e.g. Facebook API, OpenSocial API). Some examples are described in more detail below. Relationship data from multiple sources may be combined by the SRM, e.g. from multiple external social networking services.

Figure 3B:
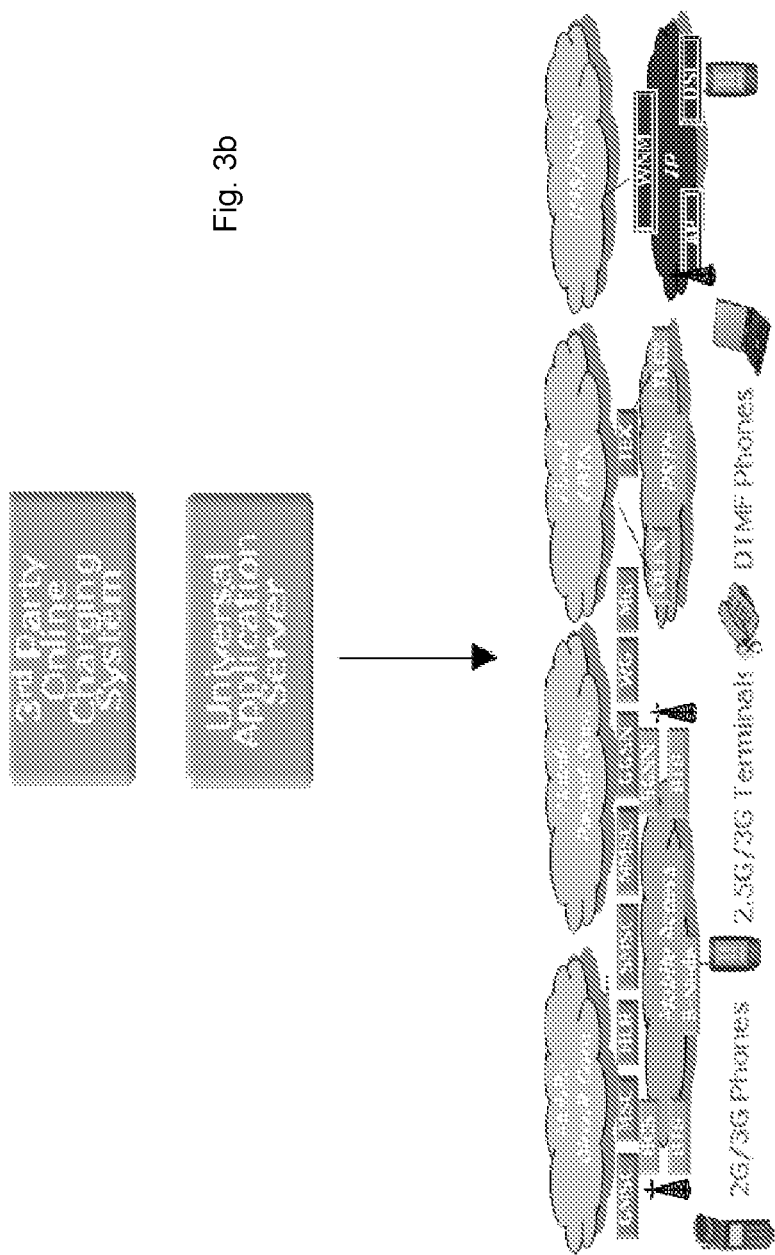
FIG. 3b is a schematic diagram of a global architecture for a convergence system according to one embodiment.

In a preferred embodiment, the SRM will be available in the following 3 modes, which are illustrated schematically in FIGS. 3a to 3c:
1. Prepaid, illustrated in FIG. 3a
2. Convergence, illustrated in FIG. 3b
3. Standalone, illustrated in FIG. 3c
Where the features are compatible, all features of the SRM will be available in all modes.

Eclipse Model

One implementation of the Eclipse model of operation will now be described in more detail. In the Eclipse Model, the SRM will be divided into various sections. Each section will be a distinct grouping of functionality for the SRM service. Each operator will have the standard features purchasing the SRM, and each of the additional sections may optionally be implemented. The different sections, each described in more detail below are:
  Standard functionality
  SRM Mass-Communication
  SRM Referral Scheme
  SRM Service bundles
  SRM Location Based Services
  SRM PromoMax Express It will be possible to switch on/off the groupings of functionality as described above and detailed in subsequent sections. The most basic level is to have only the standard functionality. An operator will then be able to choose any combination of functionality to use along with the standard functionality packaged. It is possible to implement all functionality. If a service provider does not implement a section of functionality, they will not see the other features through their screens Standard Functionality Open & Closed Social Groups There are two types of Social Groups (SGs). Open Social Groups allows any registered subscriber to join. Furthermore, any registered subscriber can invite any activated subscriber to join a SG. Closed SGs encompass authoritative measures preventing unknown subscribers from becoming a member of the SG. In fact, a subscriber cannot join a closed SG through their own actions; a subscriber can only be added by an administrator or receive a request to join from the administrator or SG subscriber with administrator rights. It will be possible for the operator to define a minimum and maximum number of members allowed for a SG.

Any registered subscriber can create an open Social Group (SG). Any registered subscriber can join an open SG. Any SG member can invite any registered subscriber to join a SG. A group creator is the group administrator. An administrator can assign administrator rights to other SG members A group administrator can remove members from a SG. All group members can send group mass communications. Group administrators can send group mass communication SMS (MC SMS).

Any registered subscriber can create a closed Social Group (SG). Any invited registered subscriber can join a closed SG. A group creator is the group administrator. An administrator can assign administrator rights to other SG members. Only group administrators can invite registered subscribers to join. A group administrator can remove members from a SG. Group administrators can send group mass communication SMS (MC SMS).

SRM Subscribers—Registered and Deactivated

There are 2 types of state that a subscriber can be in with regard to the SRM: deactivated and registered. By default, all subscribers will have the Social Relationship Manager deactivated.

Any deactivated subscriber will receive the following options
  Will not receive any SG requests
  Will not be able to join SGs
  Is able to activate the service through registration. By doing this the subscriber will become a registered subscriber.

Any registered SRM subscriber has full access to the benefits of the SRM. Any registered SRM subscriber can:
  Receive open SG requests
  Receive closed SG requests
  Accept open SG requests
  Accept closed SG requests
  Join Open SG's on demand (through the self-care mechanism)
  Request other activated/registered subscribers to join a Open SG to which they belong.

A subscriber can register to the SRM by sending an SMS to a short code. Once a subscriber has registered for the service they will have associated their MSISDN with a Nickname. When making a SG request from this number, an SMS will be sent to the invited subscriber. In the inbox sender, where normally the MSISDN or associated name from the phonebook would be displayed, this will now be displayed with the nickname selected by the inviting subscriber during registration.

A subscriber can register to the SRM by sending a SMS to an operator-definable short code. The SMS is operator definable but must include a nickname or user name for the user. The maximum length of the nickname will be definable by the operator.

In the scenario that a nickname has already been taken, a number will be assigned after the name. For example if Alex Westley is requested and is already taken by another subscriber, the nickname Alex Westley1 will be assigned. Name duplication will take the original name+1 digit in escalating order A configurable fee can be charged for registration to the SRM. This can be configurable by product type. If a prepaid user does not have sufficient credit to cover the charge, registration will not take place and the user will informed and asked to provide further credit.

An Electronic Data Record (EDR) will be created for registration complete charge. This will be query-able by the CCP and will be sent to a 3rd party billing system, for example to be incorporated into a post paid bill statement.

A confirmation SMS is then sent to the registering subscriber confirming their nickname or duplicate nickname. The remainder of the SMS is definable by the operator. It also assigns the registered subscriber with a password that they can use to log in to the operator managed web portal (used to manage SGs etc and settings)

The registration SMS will associate the nickname to the MSISDN of the user. When this registered subscriber sends a SG request, their name will be contained in the SG Request SMS & MSISDN as the incoming number (but displayed as the nickname). The MSISDN & Nickname will be shown on the operator web page for the SRM when this subscriber is a member of a SG that is displayed on the web page.

Administrators

An administrator is responsible for the subscribers that are members of a SG. In an Open SG, by default the registered subscriber that creates the SG is the SG administrator. In an open SG, the Administrator has the additional functionality of being able to remove SG members from a SG. They can assign rights to other members to be able to do this. They can remove subscribers from a group by using the operator web site where the administrator can login using their password, group name and or group number.

In a closed SG, the administrator can send requests to registered subscribers to join the closed SG. The administrator can send requests individually or can input a list of numbers into an operator managed web page. When the list is complete, SG requests will be sent out to the entire list. An administrator can assign other SG members to be group administrators. The group administrator can also remove a SG member from a SG. To do this he uses the operator managed web site. The following is a list of the functionality for a group administrator:

- Can receive open SG requests
- Can receive closed SG requests
- Can accept open SG requests
- Can accept closed SG requests
- Can join Open SGs on demand (through the self-care mechanism)
- Can request other registered subscribers to join a Open SG to which they belong
- Can request other registered subscribers to join a Closed SG to which they are the administrator
- Can assign administration rights to other registered subscribers already members of a SG
- Can send group mass-communication SMS (MC SMS)
- Can remove SG members Creating Open Social Groups Any registered subscriber can create an open social group. To do this, a subscriber can send the requested SG name to a short code. Alternatively, it can be defined so that selected subscribers only can create SGs.

It can be defined that all subscribers can create SG's

It is possible to limit SG creation by product type

It is possible to limit creation of SGs so that only invited subscribers can create SGs—here a new balance type can be created for 'create SG'. This balance type can be sent to selected subscribers through service bundle functionality.

To create a SG, a subscriber can send an SMS to a short code. If this name is not yet taken, the group will be created.

Only registered subscribers can create open social groups by sending an SMS to an operator definable short code. The SMS will be operator definable but must include a suggested group name that is sent to a specific short code for creating open social groups. The maximum length of the group name is definable by the operator.

If a SG name is already taken, the group name will be assigned with a number after it. The duplication numbers will ascend in a chronological order. That is, if the group name is taken, a return SMS will be sent with the <group name> & <SG number>. E.g. if a requested group name was 'Ipswich rugby club' and this name was already taken, then the group name created will be 'Ipswich rugby club1'. This will be sent as an SMS to the group creator to advise the group creator of the assigned name. In the event that a duplicate name is suggested, it may be necessary for the subscriber to confirm the nickname by return SMS before the group name is created.

An example SMS could be as follows: 'Ipswich Rugby club' is already taken. To accept 'Ipswich Rugby club1' please reply YES. To choose another, send new group name (max 20 characters) to 777. To confirm, a subscriber simply needs to send an operator definable command word such as YES by reply SMS. Otherwise, if the subscriber is not happy with this group name, they can re-start the process.

Successful creation of a group only takes place if the prepaid subscriber has sufficient credit to create the group, if a charge is applied by the operator. For post-paid users, an EDR will be created so this can be shown on their monthly statement.

A subscriber can spread details of the formed group by viral communication with his friends. Furthermore, since this is an open SG, any member can invite other activated subscribers to join.

The SMS will also assign a group number to the group such as 1274. When a subscriber wants to join a group, they can input the group number to find the group and consequently join, for example using the self-care IVR.

A configurable fee can be charged for creation of an open SG. This can be configurable, for example by product type or by balance cascade (only subscribers with the 'create SG' balance bucket may be able to create a SG). If a prepaid user does not have sufficient credit or an adequate balance bucket in the balance cascade to cover the charge, registration will not take place.

A CDR/EDR will be created for creation of an Open SG. This will be query-able by the CCP and the EDR/CDR will be sent to a 3rd party billing system for example for incorporation into a post paid bill statement.

Upon creation of an open social group, a return SMS will be sent to the group creator. The group creator is also the group administrator by default. The SMS will be operator definable and will include the following information:

- Confirmation of the group name or duplicate name
- Assign the SG name with a SG number
- Assign a password to the group administrator. This can be used to login to the operator managed website. Here SG members can be managed.
- Give details of the operator website
- An example confirmation SMS: 'Thank you. Ipswich Rugby Club1 is now created. Group number 12345. Password for member administration sjfitbne. Website www.esg.srm.co.uk'.

It is recommended that a subscriber saves this SMS. If a subscriber forgets any of these details they can request the password be resent to the mobile device or ring customer services from their MSISDN. The CSR will then be able to resend password etc.

In the scenario that a subscriber does not save the details of a SG, they can request details of all the SGs to which they are members by sending an SMS to a short code with an operator definable command word. The SRM will send a list of all the SG names & SG numbers via SMS. An example query message could be as follows: <Query Groups> sent to 777.

Creating Closed Social Groups

Any registered subscriber can create a closed SG. To do this, a registered subscriber will be able to send an SMS to a short code. The registered subscriber that creates the Closed SG will be the administrator. The main difference to open SGs is that administrators are only able to send SG requests to other registered subscribers. They will be able to do this through the use of their phone or through the operator managed web site.

The SG process will be identical to the create Open SG process with the exception that closed SG requests are sent to a different operator definable short codes as to open SG create requests.

Administrator Rights

In an Open SG, once a SG member has administrator rights, they can remove other SG members from the SG. In a Closed SG, once a SG member has administrator rights, they are able to send SG invites to other registered subscribers and also send group-mass communication. They can also remove SG members from the SG. Functionality for SG members with administration rights includes:

Can receive open and closed SG requests
Can accept open and closed SG requests
Can join Open SG's on demand (through the self-care mechanism)
Can request other registered subscribers to join a Open SG to which they belong
Can request other registered subscribers to join a Closed SG to which they are the administrator
Can send group mass-communication
Can remove SG Members An administrator can assign administration rights to another SG member using an operator managed portal by clicking on group members.

In real-time, once an administrator has assigned rights to a new closed SG member, this new administrator will be sent an SMS. The SMS will be operator definable and may include the following information:

Administrator <Member name> either at the start of the SMS or as the sender I.D. as definable by the operator
SG name
SG number
SG Password.

An example SMS would be "I have assigned you administrator rights to Ipswich rugby club 12, group number 12345. The password is 12345."

To assign administrator rights, an administrator can log-in through the operator manager database and simply assign the rights by clicking on group members. Please refer to the web portal operator PI section for more details. In real-time, once administration rights have been assigned to a new closed SG member, this new administrator will be sent an SMS.

Only subscribers with administrator rights can remove a SG member. To do this they must log in to the operator managed web site using the group name/number and their password. They can then click on the subscribers name or MSISDN and follow an instruction to remove this subscriber. In this way, a SG member with an admin rights is able to remove a member from a SG using the operator managed website. The website will connect with the CMX platform using the external PI. An action from the website will be to remove a subscriber from the SG.

Once a subscriber has successfully been removed from a SG, they will be sent an operator definable SMS including the following information:

Contain the SG name
Operator definable message

The SG member will instantly be removed. They are not able to re-join the group unless they are sent a new request to join from the group administrator.

In the open SG scenario, if a SG member sends an invite to this removed SG subscriber, the removed subscriber will not be added and will be sent an SMS explaining the reasons that he cannot be added. Therefore, a subscriber removed from a SG can only re-join if sent an invitation from an administrator. A return SMS to the requesting SG member will be sent. The SMS will be operator definable but may include the following information:

<member name>
An operator definable message

An example "Unfortunately <Member name> has been removed from this group. This subscriber has not been added to <SG Name>.

Open Social Group Member Request Process

Only SG members can make SG requests. To make a SG request, the registered subscriber can send an SMS to an operator definable short code, which may include the following information:

<The requested MSISDN> & <SG Number> to a short code
E.g. 0796834637+21234 sent to 888

A registered SG member can make an open SG request by sending an SMS to the SG number. It may include the following information:

<The requested MSISDN> sent to <SG Number>
E.g. 0796834637+ sent 21234

Figure 4C:
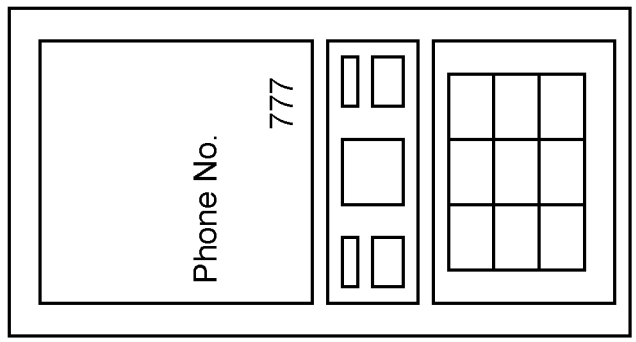
FIGS. 4a, 4b and 4c illustrate schematically the process of making a join request according to one embodiment.
Figure 4B:
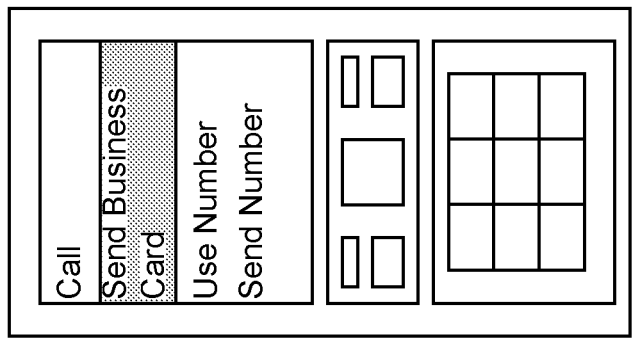
Figure 4A:
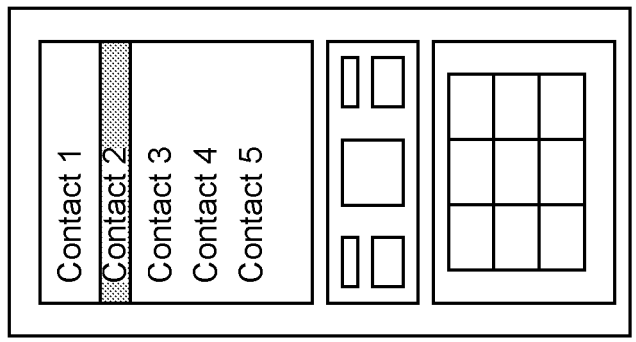
Figure 5:
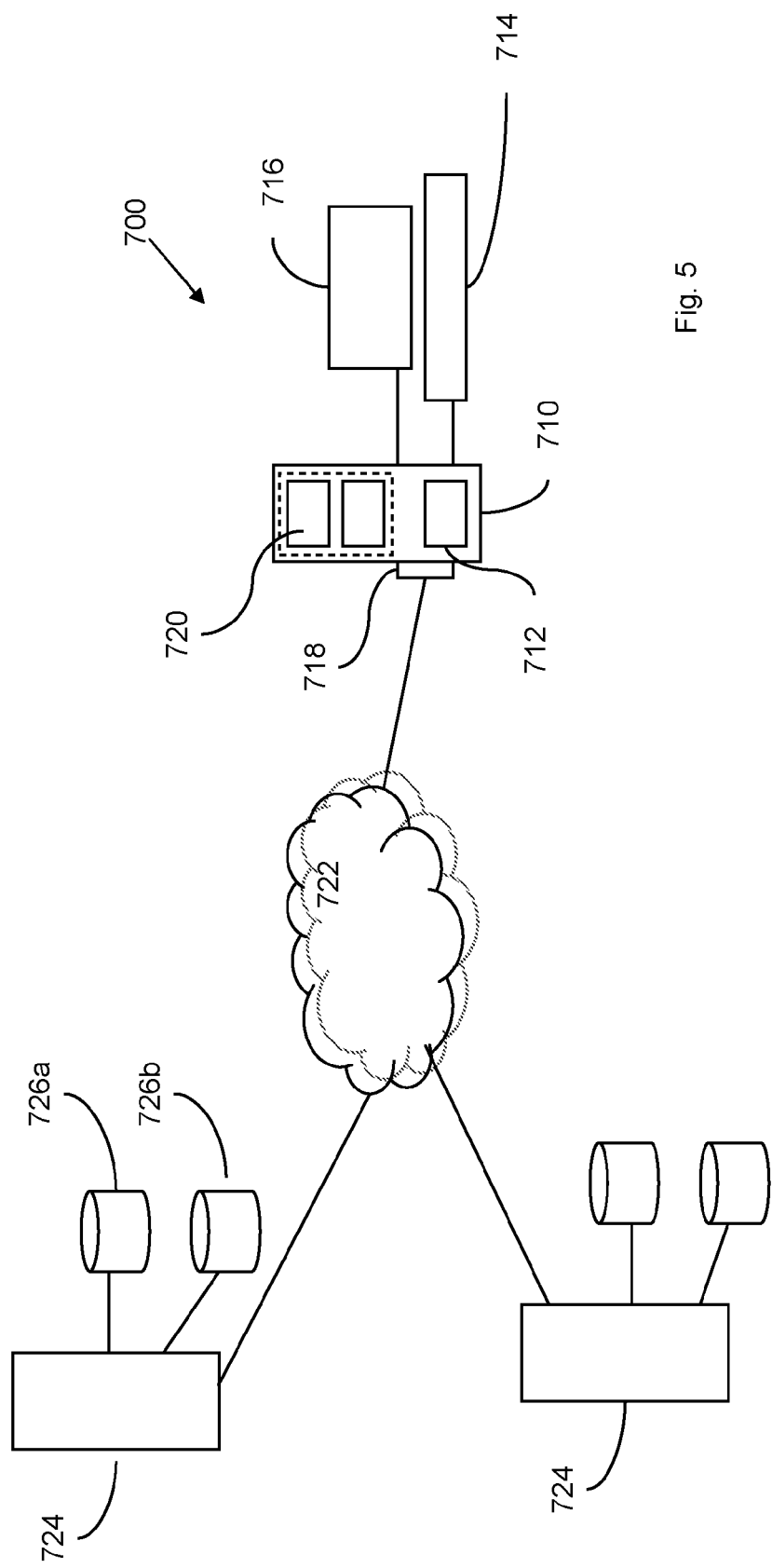
FIG. 5 is a schematic diagram of a system that may be used to implement embodiments of the methods described herein.

It is also possible to make a join SG request by sending a business card to a short code as in FIGS. 4a to 4c. In FIG. 4a, the contact to whom the user is making the member request is selected. The "send business card" option is then selected in FIG. 4b and the short code SG number is entered in FIG. 4c. This makes the process more user-friendly for the end user.

The phone number in FIG. 4c will be the SG number. A registered subscriber can make a join SG request by sending the business card of the requested MSISDN to the SG number as shown. The SRM will extract only the MSISDN from the business card.

There are 3 possible scenarios:
1. Registered→Registered
2. Registered→Deactivated
3. Registered→Off-net Registered→Registered In the outcome that a registered subscriber sends a SG request to another registered subscriber, the following SMS will be received by the invited registered subscriber. The invited registered SG member will receive an invite to a SG via SMS. The SMS will be operator definable but may include the following information:

<Registered member name>
<social group name>
Give 3 options: To join. To not join and to deactivate and stop receiving SG requests.

An example:
Oliver Becket appears in the sender I.D.
Message reads 'I request you to join Ipswich Rugby Club12. To join reply YES (2 €).

To not join do nothing. To stop receiving group requests reply STOP.

After receiving the request to join a SG, a subscriber will have 3 options: join, not join and stop receiving the SG requests through complete deactivation of the service.

In order for a registered subscriber to join a SG, the subscriber can send a return SMS with an operator definable word such as <join>.

With the Eclipse model, it is very likely that operators will want to charge subscribers for being members of a SG or at least to join. For this reason, the SRM is designed so that a subscriber must take an action in order to join. By a subscriber performing this action, it is also possible to apply a charge.

A registered subscriber that does not want to be part of a SG does not need to take any specific action. A registered subscriber that does want to receive any further SG requests can deactivate the service by simply replying <stop> to the SMS. This will be explained in greater detail in the deactivate section.

When a subscriber deactivates the service they will
Not receive any SG requests
Not be able to join SGs
Be able to re-activate the service through registration. By doing this the subscriber will become a registered subscriber.
Not receive any SG tariffs/discounts for any SGs to which they are already a member.

Registered→Deactivated

Deactivated subscribers have opted out of the SRM and cannot receive SG requests. In the scenario where a registered subscriber makes a SG request to a deactivated subscriber the deactivated subscriber will receive no request.

The registered subscriber will receive a return SMS saying that the request is unavailable as the requested number has deactivated the service.

Registered→Off-net

In this SG request scenario, the off-net number will be added to the Social Group so that a one-way relationship for SG members to the off-net subscriber is formed. In the event that a off-net subscriber is invited to be a member of a SG, the off-net number will automatically be added.

It will be possible to send an operator definable SMS to the inviting on-net number explaining that the number had been added.

In many countries such as Dubai, it is a requirement that off-net numbers will have the option to not be part of any promotion. In this case, an SMS will be sent to the off-net subscriber. The SMS will be operator definable but may include the following information:

The sender I.D will not be a short code or <SG Number>
Will contain <nickname> of inviting subscriber
Contain <SG name>
Give the option to block being a part of the SG An example: 'Oliver Becket from <esgTel> wants to add your number to <Ipswich Rugby Club>. To accept do nothing. To not allow this reply <no>.

In the event that the off-net subscriber does not want to allow his number to be part of the SG, he can reply no and his number will not be added. All relationships will be deformed. An SMS will be sent to the inviting on-net subscriber informing him that the off-net subscriber did not want to be added to the SG and that no tariffs will apply to this number It is also possible to add functionality as described below with reference to the referral scheme.

Process to Deactivate the SRM

In order for a subscriber to deactivate the SRM, a subscriber can do this in 3 separate methods:
Through the self-care mechanism
By sending an SMS to an operator-defined short code, for example <stop> sent to an operator defined short code
By replying to a SG request SMS. An example SG request could be 'Alex Westley has invited you to join Ipswich Rugby Club12. To join reply YES (2 €). To not join do nothing. To stop receiving group requests reply STOP
Any MSISDN that replies <stop> will be in the deactivated SRM state.

Closed Social Group Request Process

The SMS request process will work in the same way for a closed social group however only a group administrator or subscriber with administrator rights can make SG requests. If a group member that does not have administrator rights tries to make a SG request, the request will not be made. The subscriber without admin rights will receive an SMS. The SMS will be operator definable and may include the <group name>.

An example 'Sorry, only group administrators can make SG requests for <group name>. Request not made.

It is also possible for administrators to make SG requests via an operator-created and managed web site. Here the administrator or person with administration rights can log in with the group name, MSISDN and a password given during the Closed SG creation process. The administrator will have the option to change their password. Once the request has been made, the request SMS to be sent will follow the same process as per the SMS request process for open social groups.

SG Tariff/Discount

Once relationships are formed with regards to social group members, the following behaviour takes place following a social group call or message being initiated between members where there is a relationship formed.

It will be possible for the operator to define a common tariff/discount for SG calls to be applied across all social groups to which a subscriber is a member. This can be dictated by product type that the subscriber is associated with. It is also possible for the operator to define an individual tariff/discount for every social group created.

If a subscriber is a member of more than one social group, the cost of the call will be rated against the social group dependant on the relationship of the A & B subscriber—if both subscribers are both members of more than 2 common social groups, the call will be rated according to the tariff that gives the greater discount or cheapest tariff.

It will be possible for the tariff of the SG to be dependant on the SGs size. For example the more members a SG has, the greater the tariff/discount. Or, as the case may be, the more members a SG has the lesser the discount or tariff. The operator will be able to define a schema for a relationship between SG size and subsequent tariff/discount. There will be no limits on the schema.

On the other hand, it is also possible for the operator to define a cumulative tariff/discount. This means that a tariff or discount is dependant on the amount of SGs a subscriber is a member of so, by being a member of more than one SG, a greater discount or tariff could be given.

The operator is able to define thresholds to be met in terms of amount of SG members. When these thresholds are met, the SG tariff will change. An SMS will be sent to all SG members informing them of the change of tariff.

It is also possible for the operator to define a cumulative tariff/discount. This means that a tariff or discount is dependant on the amount of SGs a subscriber is a member of—so by being a member of more than one SG, a greater discount or tariff could be given on an individual subscriber basis It will be possible for the operator to apply a one-shot fee in order to join a SG. It will be possible for the operator to define a subscription which can be taken from the subscribers account on a monthly basis. The subscription can be specific to the SG. Alternatively, the cost of the subscription can be linked to the size of the SG, i.e. how many members the SG has.

If a subscriber is a member of more than one SG, it is possible for the operator to charge the subscriber for subscriptions to each individual SG that the subscriber is a member. For example, a subscriber is a member of 1 SG, one subscription is taken. If a subscriber is a member of 2 SGs, 2 subscriptions can be taken.

For SG members that are members of more than one SG, it is also an option for the operator to apply subscriptions based on the number of SGs of which a subscriber is a member. For example, a subscriber is a member of 1 SG—he pays a subscription of 3 E. Another subscriber is a member of 3 SGs—he pays a subscription of 5 E.

If the subscription is not taken, the subscriber will be in a grace period from the benefits of being a SG member. In the SG grace period a SG member will not:

Receive the SG tariff or discount for SG calls/messages
Receive MC SMS
Be able to invite subscribers to join this group (if a open SG)
During the SG grace period, other SG members will be able to call/message the 'Grace period SG member' and have this call/message rated according to their SG tariff/discount.

If a SG member pays his SG subscription during grace period full functionality will be resumed.

After the grace period, if a subscriber still has not recharged his account the subscriber will need to re-subscribe to the SGs of which he was previously a member. All SG relationships will be deformed. The subscriber will be sent an SMS detailing all SGs that he was previously a member of. The SMS will be operator definable and explain that these SGs are now not active.

The operator will be able to define a maximum number of social groups that a subscriber can join. The SRM has no restrictions.

It will be possible for the cost of the subscription to be linked to the size of the SG. It will also be possible for the cost of the subscription to be linked to the number of SGs of which a subscriber is a member. For example, a subscriber is a member of 1 SG—he pays a subscription of 3 E. Another subscriber is a member of 3 SGs—he pays a subscription of 5 E Business Wallets Where social groups are created specifically for businesses or another entity that may manage and pay for certain user calls, it will be possible for all calls made by SG members to be charged from a joint wallet, such as a business wallet. In this scenario, the SG created must be a closed SG. By default, the business wallet will be from the administrator's wallet. However, an administrator can assign the business wallet to be from any other member with administrator rights.

Where social groups are created specifically for businesses, it will be possible for all calls between SG members to be charged from a secondary wallet. In this scenario, the SG created must be a closed SG. By default, the secondary wallet will be from the administrator's wallets. However, an administrator can assign the wallet to be from any other Wallet ID.

It will be possible for all calls made between SG members to be charged from the business wallet. It will also be possible for the administrator to specify specific MSISDNs where all their calls are charged from the business wallet.

It will be possible to apply a charge for having a SG active for a month. Only one SG member will be charged for this rental. The charge will be to the administrator. If the charge is not paid after the grace period has finished, the SG will be closed. An extended grace period can be defined for this type of SG.

Many operators have a dedicated department for negotiating business tariffs etc on company wide plans. The SRM+PromoMax Express will have an advanced feature that will allow a group to receive a better tariff if their Average Revenue Per User (ARPU) increases. Therefore, as business expands in terms of employees being added to the SG and consequently its ARPU, the tariff will become better each time a given threshold is met. Furthermore, it should eliminate the need for yearly reviews of tariffs and so fourth Counters can be placed on the ARPU of an individual SG. The operator can then define some thresholds to be met so that when ARPU reaches this amount, an alternative tariff is applied for the group. It can be definable that this service is only available to SGs that define a business wallet.

E.g. An operator can define many tariffs

| | |
|---|---|
| 100E a month | -> tariff 1 |
| 200E a month | -> tariff 2 |
| 400E a month | -> tariff 3 |
| ... | |
| 1000E a month | -> tariff x |

Automatically and without CSR involvement/negotiation, a business can get the tariff they deserve based on the groups ARPU spend.

Tariff change swap can take place in real-time when levels are reached with confirmation to the group administrator.
Eclipse SRM+Mass Communication (MC)
Open & Closed SG It will be possible to send a SMS to all SG members. In an Open Community Group, only group administrators can send a mass-communication (MC) SMS. It will be possible for any SG administrator to send a MC SMS by sending an SMS to an operator defined short code.

The SMS will be operator definable but may include the following information:

Contain *<SG Number># e.g. for SG number 12345 write *12345#
<Contents of SMS> this will be the remainder of the SMS after the # key
The MC SMS must be sent to an operator definable short code An operator can define a separate tariff/discount for rating a MC SMS. It will be possible for the operator to define the cost of the MC SMS in relation to the number of SG members All group members will receive the MC SMS. It will consist of the following format:

Contain the SG name in the sender inbox
Contain the contents of the SMS

For Closed Social Groups, it will be impossible to reply to a MC SMS. However, in an open SG it will be possible for all members to reply & send MC SMS up to a certain amount of members as defined by the operator. An example where this functionality will be a nice end-user experience will be in small social groups, for example 10 members. Here MC SMS will be an effective way to communicate. However, in a SG of 100 people, it would not be implementable for this type of message to have many members replying to every MC SMS.

Therefore, all group members can send/reply to an MC SMS for groups under a certain size as defined by the operator.

In some embodiments, it will not be possible to reply to a MC SMS (unless using PromoMax Express functionality as described in a subsequent section).

It will also be possible to send MC SMS from the operator managed website where login details are required. Again, only the administrator or SG members with admin rights will have the functionality.

Some examples of MC SMS are as follows:

University—SMS sent to all students. 'All students of telecommunications: please note that seminar beginning 11.30 today has been cancelled due to staff illness. Apologies on behalf of the university.' This simple SMS could save a student a wasted journey to campus to which he will be very grateful and pleased with the service. The message will be sent by the administrator only. This eliminates unnecessary messages being sent.

In the scenario where the Social Relationship Manager is being used for a group of employees—The administrator can send a group SMS saying 'Staff, somebody has the key to the back entrance gate which has been left unlocked. Would the responsible person please call the office as soon as possible.'

Football club community group—Manchester United decides to sell Ronaldo—this is a very important message for the fans. The administrator sends a group SMS reading 'Beloved fans, at 10.00 am on Dec. 9, 2008 Manchester United inform you that we have sold Ronaldo to Real Madrid for a record £100 m. We assure you that this is in the best interest of the club—Manchester United FC'. A dedicated fan would love to hear this news, on the move & from his mobile as soon as this happened.

It is possible for a SG member to deactivate receiving MC SMS. They can do this by using the self-care mechanism or through the operator web site.

An off-net subscriber may want to join the social group not for benefit of receiving free calls (this is clearly impossible) but for the useful functionality of receiving the SG mass communication SMS. The off-net subscriber can send a message to an operator defined number in order to receive SG MC SMS. It will be possible for off-net subscribers to join a SG in order to receive MC SMS. To do this they can send an SMS to an operator defined number [not a short code]. The SMS will be operator definable but may include the following information:

Contain a command such as <join>
Contain the <SG number>

The subscriber must know the community group number. Therefore to join the University of Suffolk, which is community group number 1264, a subscriber can simply text 'Join 1264'. After this process the following actions take place:

A notification SMS is returned to the off-net number definable by the operator

For example, 'Thank you, you will now receive communication regarding 'The University of Suffolk'.

The number will be sent to a SRM report.

The Social Relationship Manager will store the number as an off-net SG member.

When on-net SG members call this off-net number they will be charged as per the SG (off-net) tariff plan.

Eclipse SRM+Referral Scheme

When a registered subscriber invites an off-net subscriber to be a member of a SG, if the subscriber is an off-net subscriber the following referral scheme can be implemented.

If the requested MSISDN is off-net, a 1-way relationship will be formed between the group members of the Social Group of the member that sent the invitation and the requested off-net MSISDN.

If the number is off-net, a confirmation SMS will be sent to the inviting subscriber. It will be operator definable but may include the following information:

Contain the MSISDN of the of the invited off-net subscriber
A referral message

An example could be as follows: 'Thank you. 07978332954930 has been added to your Social Group. They are not a subscriber of esgTel—if they join you will be rewarded with 10 €

The off-net MSISDN will be sent to a SRM database
The operator can run reports on these off-net numbers on demand
The information in the report can be used in a campaign to target off-net subscribers Additionally, an SMS will be sent to the off-net subscriber as definable by the operator. It may include the following information:

Nickname of the on-net subscriber that requested them
Operator name
Operator number to call An example could be the following: Oliver Becket1234567 wants you to join <esgTel>. Bring your number to <esgTel> to receive 10 € free credit.

It is necessary that there be a control mechanism to ensure that people being referred have not been in the network for a predefined period of time. One mechanism to control this is that only numbers that are ported across from an off-net number are allowed to be rewarded. Therefore, only ported numbers are subject to the referral scheme. To implement this, it is a requirement that the operator has number portability implemented into their network. A check will also be made by the SRM to make sure that the MSISDN has not been in the network for a configurable period of time.

If the ported number joins the operators' network, rewards will automatically be sent to the wallets of both the referrer and referred and both will be sent an SMS to confirm this, definable by the operator.

Eclipse SRM+Service bundle functionality

Service Bundles allow a subscriber to convert purchased credit into credit which is available for use with a specific service. A simple 'SG tariff bundle' example is where the user can purchase a package of 100 SMS for use to SG members within the next 1 month for only 10 EUR.

The SRM will be based on the service bundle functionality as designed in The Service Library. The operator can define a selection of SG service bundles that the subscriber can purchase and choose through the self-care mechanism.

The operator can define some rules around the service bundle consumption, for example:

The SG service bundle can only be consumed on calls/messages to a specific SG
The SG service bundle can be consumed on calls/messages to any SG to which a subscriber is a member It can be defined that when a SG member makes a SG voice call or sends a message that the cost of this is taken from a SG service bundle only as opposed to an SG tariff. Once all the minutes/SMS are consumed from this SG service bundle, the subscriber will revert back to using his next balance cascade, for example general cash.

The functionality above means that a subscriber can join as many SGs as he wishes. However the operator can keep track of the exact percentage of revenue that is given away through service bundle functionality from this VAS. If the subscriber is purchasing repeat service bundles, this is also good as he is utilising the service and creating more revenue for the operator.

Eclipse SRM+Location Based Services

Location-based services may also be known as 'The Home Zone' value added service. The Home Zone (HZ) concept is a service whereby the subscriber can receive a discount when using the operator's services from a fixed location(s). A subscriber can nominate up to 9 different areas as preferred zones. It is possible to offer the subscriber a discount when calling from within one of the zones he has nominated, but also to offer a discount to the caller if the person who is receiving a call from the subscriber is on-net in a zone nominated by the calling subscriber.

In Social Relationship Manager, when the subscriber makes a call from within a fixed area, either his SG tariff or discount will be triggered to rate the call, or the cost of the call will be taken from the subscribers SG service bundle. For example, a closed social group is created named—The University of Suffolk. The group administrator uses the self-care mechanism to define the campus cell I.D. Whenever a student, a social group member, makes an SG call from within this area, they are rated against a second tier of tariff or discount. Discounts can be applied to the following scenarios with regards to SG zones:

Neither A or B party within zone
A party is in zone
B party is within zone
A & B parties are within zone A complete tariff plan for a community group can be defined now as below:

a discount on previous SG tariff or a separate additional tariff plan. The services applicable to the tariff plans will include the capability to define all those services as to CCS capabilities for control plans: the operator can choose which services apply.

Tariff plans or discounts as above will be definable for the following scenarios: Party A in the zone, Party B in the zone, Party A & B in the zone.

When a Home Zone discount is active for a call, the following tag shall be added to the EDR produced by the UBE: SERVICE=HZ A subscriber shall be able to record his current location as one of his preferred zones through the IVR self care interface.

Only the administrator or person with administration rights can set the SG zone through the use of the MSISDN. It will be possible to set up to 9 different zones to be SG zones. This is operator definable.

Eclipse SRM+PromoMax Express

Social Relationship Manager will use service logic as a basis for being able to reward SGs or SG group members. In particular, PromoMax Express will allow the operator to define a number of counters which may be used for the application of rewards in real time or at the end of each period. Each counter is defined with a name, along with the period which should be used for the promotion—the options which will be provided will be that rewards can be applied daily, weekly, monthly or by yearly basis. The Unit of each

| | Type of Use | Bronze | Silver | Gold |
|---|---|---|---|---|
| Neither Party in the Zone | SMS | 10 cent | 7 cent | 3 cent |
| Neither Party in the Zone | MMS | 20 cent | 15 cent | 8 cent |
| Neither Party in the Zone | Voice call | 10 cent per minute | 7 cent per minute | 3 cent per minute |
| Neither Party in the Zone | Video call | 30 cent per minute | 25 cent per minute | 15 cent per minute |
| Party A In the Zone | SMS | As above + 10% discount | As above + 10% discount | As above + 10% discount |
| Party A In the Zone | MMS | As above + 10% discount | As above + 10% discount | As above + 10% discount |
| Party A In the Zone | Voice call | As above + 10% discount | As above + 10% discount | As above + 10% discount |
| Party A In the Zone | Video call | As above + 10% discount | As above + 10% discount | As above + 10% discount |
| Party B In the Zone | SMS | As above + 5% discount | As above + 5% discount | As above + 5% discount |
| Party B In the Zone | MMS | As above + 5% discount | As above + 5% discount | As above + 5% discount |
| Party B In the Zone | Voice call | As above + 5% discount | As above + 5% discount | As above + 5% discount |
| Party B In the Zone | Video call | As above + 5% discount | As above + 5% discount | As above + 5% discount |
| Party A + B In the Zone | SMS | As above + 15% discount | As above + 15% discount | As above + 15% discount |
| Party A + B In the Zone | MMS | As above + 15% discount | As above + 15% discount | As above + 15% discount |
| Party A + B In the Zone | Voice call | As above + 15% discount | As above + 15% discount | As above + 15% discount |
| Party A + B In the Zone | Video call | As above + 15% discount | As above + 15% discount | As above + 15% discount |

In the scenario where a subscriber creates their own group, he will be able to set the group zone when he is physically in the zone by using the self-care interface. Only SG administrators or SG members with Administrator rights can do this.

It will be possible for the operator to define a tariff plan override if a Location Based Service (LBS) call is made. The LBS tariff plan will be definable by product type. It can be counter will allow cash, time or number of events to be used as the criteria of the promotion—so, for example, a counter for talk time each day and a counter for cash spend each month may be configured. The number of events functionality allows counting of the number of calls, SMS, or any other ChargingMax UBE charged services to be tracked.

The ChargingMax Reward is calculated either at the end of the period during the expiration of the counter or fired in real time during session closing when the reward level is reached. This allows the operator to target short term usage campaigns or alternatively, look at longer term strategies where use over each month or year are used as the criteria of the promotion.

The service will be developed to allow counters on behaviour within SGs. Furthermore, Social Relationship Manager will allow counters by SG to be compared against other SGs/SG group members. Counters will be available on:

Date SG created
Number of SG members
ARPU of SG
ARPU of individual SG members within a SG
Spend on a particular service as per capabilities in CCS for control plans for an individual SG member
Spend on a particular service as per capabilities in CCS for control plans for an individual SG
Number of SGs an individual subscriber is a member of When each service and rating scenario is defined the counters which should be updated are chosen to give the operator full control over which services will be used as part of the promotion.

Expenditure may be tracked through one of the following methods:

cash expenditure tracking: this keeps track of the amount of currency spent by the subscriber
time tracking: this keeps track of the call time of the subscriber (voice calls only)
unit tracking: this keeps track of the amount of calls made/SMSes sent by the subscriber It shall be possible to configure a different tracking method for each reward scheme, but within a reward scheme, only one tracking method may be used.

Within each reward scheme, it shall be possible to configure the time limit after which the tracked expenditure will be reset. Possible values are: daily, weekly, monthly or yearly.

Limitless Credit Reward schemes may be defined. In a Credit Reward scheme, the expenditure or reaching a certain group size of the following parameters:

Number of SG members
ARPU of SG
ARPU of individual SG members within a SG
Spend on a particular service as per capabilities in CCS for control plans for an individual SG member
Spend on a particular service as per capabilities in CCS for control plans for an individual SG
Number of SGs an individual subscriber is a member of is evaluated against a single expenditure/size threshold, either in real-time or when the expenditure time limit expires. Depending on the accumulated expenditure value/size of group at that point, one of the subscriber's balances/administrator/group creator/group members may be credited.

The following parameters may be provided:
name of the reward scheme
tracking method (cash, time, units)
time limit (daily, weekly, monthly, yearly)
contributing destinations
expenditure threshold value per product type
real-time or not (if not, the reward is given when the time limit expires)
reset expenditure counter after real-time reward (yes or no)
balance type to credit (product type specific)
credit value (product type specific)
credit validity (product type specific)

A notification SMS shall be sent to: All SG members, Individual SG members and/or SG Administrator/creator when a reward is being given. As definable by the operator.

It shall be possible to view current status of services to which counters are defined via the User SMS (USMS) GUI (which may be implemented in Java screens).

It may also be possible to view the current status to which counters are defined via the eServGlobal PI.

A functionality of Social Relationship Manager is the ability to reward a SG based on group performance. The reward can be given as pool minutes—this can be sent to the group administrator as a notification SMS. This feature will be particularly useful when the SRM is used to define groups of employees. The pool minutes will then be consumed by the social group members on SG tariff plans. Pool minutes can also be defined as the balance bucket used first to pay for SG mass-communication.

The following provides examples of reward schemes that can be defined using the SRM. It will be possible for all examples to be implementable using the SRM.

A reward is offered by operator, use an additional 10 € of airtime within 1 month on SG calls and move to the gold product type. As soon as subscriber uses 10 € on intra-community calls he gets moved to gold in real-time and receives an SMS.

Reward—send 300 SMS this month to SG members and receive SMS for free for the rest of the month. Once subscriber uses 300 SG SMS, he receives a SMS to inform him the reward was reached and that he will now get free SMS till the end of the period.

Rewards—a group member receives a SMS saying 'congratulations, you are the University of Suffolk group member that has talked for the longest during the month—you receive free 80% discount on video calls for the month'.

Rewards—groups can be rewarded based on their SG size. E.g. a group can be rewarded for reaching a definable size, e.g. 100 group members. In real-time when the group reaches this size, all members can be rewarded with something.

Rewards—can be given on group size in comparison to other groups. For example, a reward can be given to group members from 'The University of Suffolk' community against 'The University of Essex' for having more group members.

Reward—a business; eServGlobal uses the Social Relationship Manager to define a Community group of its employees. During the month, based on the group's telephony performance, they qualify for 1000 intra-community pool minutes. The group administrator is notified. The minutes are consumed equally by all SG members on SG usage.

A Social Group can be rewarded with a better intra-group tariff once spending is above a certain threshold as defined by the operator.

Eclipse Model Operator Web Portal PI Commands

A subscriber will be able to log into an operator-created & managed web site using their password which is provided at registration. The website will interact with the CMX platform using the external PI. Using the website, a user will be able to manage their SGs that they are a member of and view information regarding their account and SRM promotions. This is not an exhaustive list as more requirements may be discovered during the SRS phase.

It will be possible to create PI commands for at least some of the following actions:

- A registered subscriber can log in using their nickname/MSISDN & password assigned during the registration process
- A logged in subscriber can view their SGs that they are a member of (nickname & MSISDN) and corresponding tariffs/discounts for that group
- A logged in subscriber can view the SG members that they are a member of (displayed by MSISDN and nickname)
- A logged in subscriber can view their current balances
- A logged in subscriber can view their SG service bundle options
- A logged in subscriber can view their PromoMax Express balances—current situation and targets in order to reach rewards etc
- A logged in subscriber can view their maximum number of SGs permitted (if defined by the operator) & their current amount of SGs
- A logged in subscriber can remove themselves from a SG
- An administrator can invite subscribers to join a SG
- An administrator can remove subscribers from a SG
- An administrator can assign administrator rights to other SG members
- An administrator can assign a business wallet for intra-SG calls
- An administrator can assign a business wallet for al SG member calls
- An administrator can assign a business wallet for all calls for specific MSISDN's The following section refers to all self-care mechanisms available to the subscriber using the SRM Eclipse model. Inside the scope of the project the self-care service logic flows will be defined. Using the IVR mechanism, a subscriber will be able to undertake the following actions specifically in relation to the SRM service only. This is not an exhaustive list as more requirements may be discovered during the SRS phase.

- Can listen to details of the service
- Can listen to how many SGs a subscriber is permitted to be a member of
- Can listen to how many SGs a subscriber is a member of
- Listen to the SG name (if possible) and the SG number
- Details of the SG tariff/subscription/service bundle
- Listen to available service bundles
- Purchase a SG service bundle
- Listen to active service bundles
- And any minutes/credits etc that are remaining
- Activate/Deactivate receiving MC SMS
- Set home zone cell I.D.
- Listen to any promotions that are active
- And current threshold status
- Rewards that are on offer To remove a SG the subscriber simply needs to select the SG to be removed and then to confirm this action. When a SG is removed, an SMS will be sent to the subscriber removing the SG.

Command List Alternatives

For each SMS command, it is likely that subscribers will sometimes not input quite the correct word. For example, if the command action is STOP and the subscriber enters STP, it will be possible for the operator to define as many alternatives to the command word as possible and for each command. The defined alternatives have the same effect as if the correct command had been sent.

Atomic Model

An embodiment of the Atomic Model of implementation will now be described by way of example. The atomic model is different to the eclipse model by the way that relationships are formed between subscribers. The atomic model creates relationships by individual subscribers requesting to be 'friends' with other subscribers. The relationship is a 2-way relationship. Once a relationship is formed, special behaviour with regards to tariffs or discounts can be applied.

Standard Atomic SRM Functionality

For all subscribers, there will be 3 states that a subscriber can be in with regards to the SRM Atomic Model. Each of the states will be explained in greater detail below.

By default, all subscribers will have the service active. In the active state, subscribers will have the following functionality

- Can receive friend requests and be added as a friend (1 way relationship)
- Cannot request friend links
- Can deactivate the service and stop receiving friend link requests
- Can register to the SRM Registered subscribers have the service fully active. The functionality will be as follows:

- Can receive friend requests and be added as a friend (2 way relationship)
- Can request friend link requests
- Can login to the operator website to manage friend links
- Can deactivate the service and stop receiving friend link requests
- Can have a periodic fee apply Deactivated subscribers have the service fully inactive. The functionality will be as follows:

- Cannot receive friend link requests
- Cannot request friend link requests
- Can be added as a friend link (1 way relationship)
- Can reactivate the service through registration Registering to the SRM Service In order for a subscriber to benefit from all the features of the SRM, a subscriber must first register to the SRM. One of the features of being a registered subscriber is being able to make friend link requests. During the registration process, it is required for a subscriber to register their nickname with the SRM—so that when they make a friend link request, this is the name that the subscriber being requested is able to see. In order to do this, a subscriber can send a SMS to an operator defined short code. The short code may include the following information: <nickname consisting max number of characters as definable by operator> sent to <a short code operator definable> e.g. Oliver Becket→777

If the subscriber sends a registration request that is over the operator definable amount of characters, a return SMS will be sent explaining how to send a registration request as definable by the operator.

Name duplication is possible due to the MSISDN being the unique identifier

Once the nickname or duplicate nickname is authorised by the SRM, a confirmation SMS will be sent to the registering subscriber in the following format:

- The SMS will contain confirmation of the <nickname>
- Contain information of a one-shot charge or subscription in order to complete registration. This will be applied by return confirmation SMS Example SMS can be 'You have selected oliver becket1 to be your nickname. Reply Yes to confirm (registration cost 3 E) Or re-register to choose another nickname' or 'You have selected oliver becket1 to be your nickname. Reply Yes to confirm (monthly subscription cost 3 E) Or re-register to choose another nickname'

In order to confirm acceptance of nickname and to accept one-shot charge/subscription (if defined) a subscriber can reply to the SMS with the following format: <yes> The command is operator definable, multiple responses may be defined for positive and negative answers.

Registration will only be complete if the subscriber has sufficient funds in his account to cover the costs of the one-shot fee or subscription.

When the SRM receives the confirmation SMS it will:
Register the nickname or duplicate nickname with the MSISDN that sent the registration request.
Store this information so that when the subscriber makes a friend request, this name & number appears on the create friend link request SMS Once the association between nickname or duplicate nickname & MSISDN is created, a confirmation will be sent to the registering subscriber:
The SMS will contain confirmation of the nickname
The subscriber will now move to the registered SRM state
An example SMS could be as follows: 'Thank you. Nickname Oliver Becket1 is now registered.

Once a subscriber enters the registered SRM state, they will have all of the functionality as described below. Each MSISDN can only create one nickname.

Creating Friend Links

A subscriber will want to call his friends on a regular basis. However, he may not know which network they are on. With the SRM a subscriber can make a 2 way friend link with other on-net subscribers and a 1 way friend link with off-net subscribers. Before a subscriber can make a friend link request he must first register his nickname and number with the SRM platform.

A subscriber can create a friend link one of two ways:
1. By sending an SMS containing the requested number to an operator definable short code, i.e. <MSISDN of requested number> sent to <operator definable short code> e.g. 07969565239 sent to 777.
2. By sending a business card of the requested MSISDN to a operator definable short code as in FIGS. 4a-4c. The SRM will extract only the MSISDN from the business card. Where the business card contains multiple identities these will be associated to the end user account.

The SRM will support the following business cards: V Cards, H card, N Card and/or Open Synch.

After the subscriber makes this friend request, the following actions will take place. The SRM will take the MSISDN from process 1 or 2 and check the HLR to see if the MSISDN is an on-net number. By checking the HLR, the SRM will know whether the MSISDN is on-net or off-net (+ the offnet number's operator name). The SRM will check whether the requested MSISDN is a registered, active or deactivated subscriber.

It is necessary for the SRM to check the state of the requested MSISDN. This is because:
Deactivated subscribers cannot receive friend link requests
Activated subscriber can receive friend link request (1 way relationship to be formed)
Registered subscribers can receive friend link requests (2 way relationship to be formed)

In the scenario that the requested on-net MSISDN is in the deactivated SRM state, the following actions will take place:
A 2-way friend create link will automatically be created, however it will only act as a one-way relationship—as in when the registered subscriber calls the friend link that has the service deactivated, they will receive an alternative tariff or discount.
When the subscriber with the service deactivated calls the subscriber that requested the create friend link, there is no special behaviour in terms of SRM rating. It will be a normal call.
If the deactivated subscriber in the future becomes a SRM registered subscriber, the 2-way relationship acting as a 1-way relationship will automatically be restored to a fully functioning 2-way relationship. That is when either subscriber calls the other, it will be trigger a friend link tariff or discount.
A SMS will be sent to the registered SRM subscriber saying the friendship was formed and associated tariffs will now be valid. The SMS will be definable by the operator but should contain the MSISDN of the requested friend link.
A deactivated SRM subscriber will not receive any SMS regarding friend link requests.

The following actions will take place when a registered subscriber sends a friend link request to an activated subscriber
A 2-way friend create link will automatically be created, however it will only act as a one-way relationship—as in when the registered subscriber calls the friend link that has the service activated, they will receive an alternative tariff or discount.
When the subscriber with the service activated calls the registered subscriber that requested the create friend link, there is no special behaviour in terms of SRM rating. It will be a normal call.
If the activated subscriber in the future becomes a SRM registered subscriber, the 2-way relationship acting as a 1-way relationship will automatically be restored to a fully functioning 2-way relationship. That is when either subscriber calls the other, it will be trigger a friend link tariff or discount
If the state is 'activated', a SMS will be sent to the registered SRM subscriber saying the friendship was formed and associated tariffs will now be valid. The SMS will be definable by the operator but should include the MSISDN of the requested friend link.
Due to the fact that in order to create a 2 way friend link relationship or to deny a friend link relationship a subscriber must be in the registered SRM state, the activated subscriber will be presented with an SMS with the following options:
<nickname> of inviting subscriber
Operator definable SMS E.g. 'Oliver Becket1 has sent a friend request. To receive discounts when you call this number please register. Reply with your nickname (max 20 characters). To deactivate the service, reply STOP'

In the scenario that a subscriber replies to accept through registration, the registration process described above will be followed. In the scenario that a subscriber does not reply to a friend link request, the SRM relationship will continue to act as a one-way relationship. In the scenario that a subscriber replies STOP to the friend link request, the SRM will store the MSISDN of the requested friend link subscriber as a deactivated subscriber. This MSISDN will now receive SRM functionality as defined for a SRM deactivated subscriber.

The following actions will take place when a registered subscriber sends a friend link request to another registered SRM subscriber. An SMS will be sent to the inviting subscriber saying the friendship was formed and associated tariffs are now valid. Because this is a registered subscriber, the requested number will already have an associated nickname. This can be inserted into the SMS. The SMS will be definable by the operator. The SMS should include the MSISDN of the invited subscriber & nickname. An example SMS could be as follows: 'Thank you. Friend link with <Oliver Becket1> <0795732904967> is now formed and friend link tariffs now apply'.

A SMS will be sent to the invited subscriber saying that another subscriber had requested a friend link. The SMS is definable by the operator and should include the nickname of the requesting subscriber. The SMS will present the following options: to accept do nothing. To deny reply <no>. To deactivate the service reply <STOP>. An example is as follows: 'Oliver Becket1234567 has sent a friend request. To accept do nothing—friend link tariff applies now. To deny reply NO. To deactivate the service reply STOP'

The subscriber being requested will clearly be able to see the name of the subscriber that is attempting to create the friend link.

To make the service have less load on the platform and so that it is easier from the end user point of view, the friend relationship will automatically be formed and the friend link tariff will now apply, as explained in the SMS.

A subscriber does not need to take any action in order to accept a friend link request. The friend link tariff will apply automatically.

If the subscriber receiving the friend request does not want the link to be made they can reply no to a short code. These 'deny' SMS will have their own chargeable event tariff as defined by the operator. It is possible to make this SMS free of charge. A SMS will also be sent to the invited subscriber saying that another subscriber had requested a friend link. The following describes the process in greater detail.

In order to deny a friend link request, a registered subscriber can reply to the SMS simply by sending an SMS to an operator definable short code consisting of the following format:

<NO> sent to <operator definable short code>

After the command not to create the friend link has been sent, the following logic will take place:

An SMS will be sent to the invited subscriber confirming that the friend request was not made. It will include the nickname of the registered subscriber that made the request and be definable by the operator. An example could be as follows: 'Thank you. This is confirmation that friend request from Oliver Becket1 has not been created. No friend link tariff applies'.

An SMS will be sent to the registered subscriber that made the request to explain that the friend request had been denied. It will be operator configurable but should include the nickname & MSISDN of the invited friend link subscriber. An example could be as follows: 'Unfortunately Oliver Becket1234567 079783637283 has denied your friend request. Friend link tariff does no longer applies'. No SRM friend link tariffs will apply for calls between these 2 subscribers.

Friend Link Request On-Net—Off-Net

After the HLR check described above, it is known whether the requested friend link subscriber is an on-net or off-net subscriber. This section details the logic that takes place when it is an off-net subscriber and no referral scheme is implemented. The referral scheme is described below.

If the requested MSISDN is off-net, a 1-way relationship will be formed between the registered requesting MSISDN and the requested off-net MSISDN.

If the number is off-net a confirmation SMS will be sent to the inviting subscriber. It will be operator definable but should include the MSISDN of the of the invited off-net subscriber. An example could be as follows: 'Thank you. 07978332954930 has been added to your friends.

It is a requirement in many countries that even if the requested friend is an off-net number that they must have the option to deny a friend request. For this reason the following logic will apply: A SMS will be sent to the invited off-net subscriber saying that an on-net subscriber had requested a friend link. The SMS is definable by the operator and should include the following:

The sender number will be a long number and not a short code

Contain the nickname of the requesting subscriber

Contain the operator name from the inviting subscribers network

Present the following options: to accept do nothing. To deny reply <no>.

An example is as follows: 'Oliver Becket1 from <esgTel> has sent a friend request. To accept do nothing. To deny reply NO.

In the event that an off-net subscriber replies to deny the friend request, all friend link relationships will be deformed. Confirmation SMS will be sent to both parties and will be operator definable.

It is also possible to implement a SRM Referral scheme. This functionality is described below.

Query Friends

It will be possible for a registered subscriber to query their friend links, for example by sending a command word to an operator definable short code: e.g. <query> Sent to 777.

The SRM will send a list of all friend links created via SMS. The SMS will be an operator definable message containing a list of all friend links—preferably both nickname and MSISDN.

It will be possible for a subscriber to query a individual MSISDN to see if they are a friend link. The SRM will return a yes/no reply and an operator definable message.

Removing Friend Links

It is possible for a registered subscriber to remove friend links once they have been created. To do this, a subscriber simply needs to the send the MSISDN or a business card or nickname of the link that they want to remove to a short code. For example, <0794729848729> sent to 1000.

An SMS will be sent to the subscriber removing the friend link—this will be operator definable but should include the nickname of the subscriber being removed and their MSISDN. An example could be 'This is confirmation that the friend link with Oliver Becket 03284762848489 has been removed. Friend link tariffs no longer apply'.

An SMS will be sent to the removed friend informing that the friend link had been removed. It will be operator definable but should include the nickname of the removing subscriber. An example SMS could be as follows: 'Unfortunately OliverBecket1 has removed your friend link. Friend link tariffs no longer apply with this user'

SRM Behaviour Once Friend Links are Created

Once there are friend links created, there must be some benefit to both subscribers. This is because once there is a relationship formed an alternative tariff or discount may be charged for the cost of that call. The following are functions that can be defined:

The SRM allows preferential rates to be activated when calling another subscriber to which a friend link has been created. When calling another friend link, a discount could be received, for example 20%. The operator must define which services are to be included in the scheme, such as voice calls or SMS.

It shall be possible to define whether an alternative SRM tariff shall be applied to:
- Home Public Land Mobile Network (HPLMN) voice, video, fax or circuit switched calls
- HPLMN SMS or MMS MO
- Any combination of HPLMN calls and HPLMN MO Messaging
- neither (SRM disabled for product type)

The SRM service shall be enabled for the selected network services across all product types and will be linked to the capabilities of CCS and subsequent control plan logic.

For each applicable service the tariff/discount that are applied for a subscriber will be dependent on the product type that is defined. For example, an operator may have 3 separate product types: bronze, silver and gold. The friend link tariff is defined as the following:

| Type of Use | Bronze | Silver | Gold |
| --- | --- | --- | --- |
| Friend link SMS | 10 cent/ % discount | 7 cent/ % discount | 3 cent/ % discount |
| Friend link MMS | 20 cent/ % discount | 15 cent/ % discount | 8 cent/ % discount |
| Friend link Voice call | 10 cent per minute/ % discount | 7 cent per minute/ % discount | 3 cent per minute/ % discount |
| Friend link Video call | 30 cent per minute/ % discount | 25 cent per minute/ % discount | 15 cent per minute/ % discount |

It shall be possible to configure alternative tariffs for voice calls between friend link subscribers through the use of an alternative tariff plan that overrides the normal tariff plan for voice calls. This is configurable per product type or can be the same tariff plan for all callers It shall be possible to configure alternative tariffs for voice calls between friend link subscribers through the use of discount plan that overrides the normal tariff plan for voice calls. This is configurable per product type or can be the same discount plan for all callers It shall be possible to configure alternative tariffs for video calls between friend link subscribers through the use of an alternative tariff plan that overrides the normal tariff plan for video calls. This is configurable per product type or can be the same tariff plan for all callers It shall be possible to configure alternative tariffs for video calls between friend link subscribers through the use of discount plan that overrides the normal tariff plan for video calls. This is configurable per product type or can be the same discount plan for all callers.

It shall be possible to configure alternative tariffs plans for SMS between friend link subscribers through the use of tariff plan that overrides the normal tariff plan for SMS. This is configurable per product type or can be the same tariff plan for all callers.

It shall be possible to configure alternative discounts tariffs for SMS between friend link subscribers through the use of discount plan that overrides the normal discount plan for SMS. This is configurable per product type or can be the same tariff plan for all callers.

It shall be possible to configure alternative tariffs for MMS sent between friend link subscribers through the use of tariff plan that overrides the normal tariff plan for MMS. This is configurable per product type or can be the same tariff plan for all callers It shall be possible to configure alternative discounts tariffs for MMS between friend link subscribers through the use of discount plan that overrides the normal discount plan for MMS. This is configurable per product type or can be the same tariff plan for all callers If a SRM discount or tariff is applied to a call or message, a tag shall be added to the EDR produced by the UBE. An example could be SERVICE=SRM.

If a discount is accrued through the SRM service, then any subsequent Value Added Services which may be applicable, but which are configured to have a lower priority than SRM, are skipped, and no further discounts will be accrued from these Value Added Services.

It shall be possible to setup an optional recurring SRM subscription fee that will be charged to each SRM subscriber every period. The amount of the fee shall be configurable per product type. The fee shall be applied automatically when registering to the SRM, and subsequently every 30 days since the last fee was applied. A notification SMS shall be sent every time the fee has been applied.

If a subscriber does not have sufficient credit when the recurring monthly fee for the SRM subscription is applied, a notification SMS shall be sent to the subscriber, and a SRM grace period shall be started that will last for a configurable amount of days (min. 1 day, max. 5 days). During this grace period, the SRM service shall remain active for the subscriber.

If a recharge is made during the grace period, a second attempt shall be made by the service to apply the monthly subscription fee. If this attempt succeeds, service shall be resumed as before; if the attempt fails, the SRM service for the subscriber shall be deactivated by the system. In both cases a notification SMS shall be sent to the subscriber.

In the event that a subscriber does not pay the monthly fee for the SRM service even after the grace period finishes, the subscriber will move to the SRM activated state. If they want to reactivate the service when they have sufficient credit, they can do this by sending an SMS to a short code. The SRM will recognise the subscriber from their MSISDN. Reactivation of the SRM service by the subscriber during the notice period shall not be possible.

A subscriber can move to the registered SRM state after failing to pay a subscription by sending a SMS to a short code. This can not take place until after the notice period. The message may comprise the following format: <re-register> sent to <operator definable short code>. After successful payment has been taken, all previous friend links created will be restored.

In the case where a recurring monthly fee is charged for the SRM service, deactivation of the SRM service by the subscriber shall only take effect at the end of the period for which the subscriber in question has already paid the subscription fee. At the end of this notice period (i.e. the final monthly period), the recurring fee shall no longer be applied and the SRM service of the subscriber shall be deactivated by the system. The subscriber will move to the SRM deactivated state In the case where no recurring fee is charged for the SRM service or in the case where a subscriber deactivates the SRM service during the grace period, there shall be no notice period and deactivation of the SRM service shall take effect immediately. The subscriber will move to the SRM deactivated state immediately.

Notification of a Friend-Link Call

The most important factor for a subscriber when making a call/sending a message to a friend link is that he is aware that the cost of the call was rated in a special intra-friend link tariff/discount/service bundle. This can be achieved through 2 separate mechanisms.

When making a friend link call, before being connected to the 'ring ring' tone, a subscriber hears a short message saying an operator definable message.

For example, 'this is a friend-link call' as defined by the operator.

This can be substituted by a beep or skipped by a subscriber using the self-care mechanism A SMS can be sent to a subscriber to inform him of the cost of the call or SMS, old and new balance and that the call was rated as a friend link call/SMS Atomic SRM+Referral Scheme When a subscriber invites another subscriber to be a friend link, if the subscriber is an off-net subscriber the following actions will also take place as part of the SRM referral scheme if the operator implements the referral scheme into their network. The off-net MSISDN & corresponding network will be sent to a SRM database. The operator can run reports on these off-net numbers on demand. The information in the report can be used in a campaign to target off-net subscribers.

Additionally, an SMS will be sent to the off-net subscriber as definable by the operator. It may include at least the following:
Nickname of the on-net subscriber that requested them
Operator name
Operator definable text
An example could be the following: Oliver Becket1 wants you to join <esgTel>. Bring your number to <esgTel> to receive 10 E free credit.

If the number is off-net a confirmation SMS will be sent to the inviting subscriber. It will be operator definable but should contain the MSISDN of the invited off-net subscriber and a referral message. An example could be as follows: 'Thank you. 07978332954930 has been added to your friend links. They are not a subscriber of esgTel—if they join you will be rewarded with 10 E free credit.

It is necessary that there is a control mechanism to ensure that people being referred have not been in the network for a predefined period of time. One mechanism to control this is that only numbers that are ported across from an off-net number are allowed to be rewarded.

Only ported numbers are subject to the referral scheme. It is a requirement that the operator has number portability implemented into their network.

If the ported number joins the operators' network, rewards will automatically be sent to the wallets of both the referrer and referred and both will be sent an SMS to confirm this, definable by the operator.

Atomic SRM+Service Bundles

Another mechanism for promoting friend link calls is through the use of service bundles. In this way, a registered SRM subscriber can purchase a friend link service bundle. Service Bundles allow a subscriber to convert purchased credit into credit which is available for use with a specific service. A simple 'friend link bundle' example is where the user can purchase a package of 1000 SMS for use to friend links within the next 1 month for only 10 EUR.

It is a suggestion that the operator can define a campaign whereby there is no monthly subscription to the SRM. Furthermore, that there is no limit on the amount of friend links that can be formed or separate tariff/discount for friend link calls. Instead, subscribers purchase service bundles for this type of call as and when they need them or per monthly basis. If their bundle runs out, if a friend link call is made it will be charged as per their normal tariff until a subsequent service bundle is purchased.

The operator can define a range of service bundles on offer, for example:

| Type of Use | Light Friend Talker Service Bundle | Medium Friend Talker Service Bundle | Socialite Friend Service Bundle |
|---|---|---|---|
| Friend link voice | 50 minutes | 100 minutes | 200 minutes |
| Friend link video | — | 20 minutes | 50 minutes |
| Friend link SMS | 50 SMS | 150 SMS | 300 SMS |
| Friend link MMS | — | 10 MMS | 50 MMS |

The Service Bundles service allows the operator to define up to 10 Friend link Service Bundle Credit Transfers. A Service Bundle Credit Transfer will result in a debit being made from the wallet of the subscriber (the cost of the Service Bundle), and a credit being made into the wallet of the subscriber (the credit value of the Service Bundle).

For each Friend link Service Bundle, the following parameters may be defined:
name of the bundle
cost of the bundle
credit value of the bundle
The cost of the bundle shall be expressed in cash.
The credit value of the bundle shall consist of four balance credits whereby the following parameters need to be specified for each balance credit:
balance type (all existing chargeable balance types are allowed)
recharge value (expressed in cash, time or units depending on the balance type)
validity (expressed in days)
Friend link service bundles can only be consumed on friend link calls or messages
It shall be possible to purchase a friend link service bundle using a one-shot fee providing the subscriber has sufficient credit
It shall be possible to setup a recurring Service Bundle subscription that will result in the configured Service Bundle being purchased automatically each month. A notification SMS shall be sent every time the Service Bundle has been purchased. A first Service Bundle purchase shall occur when the subscriber activates a subscription.

A subscriber can only be subscribed to one single Service Bundle at a time. It shall be possible for a subscriber to purchase a Service Bundle even if he has an active Service Bundle subscription.

If a subscriber does not have sufficient credit when the monthly Service Bundle purchase is being executed, a notification SMS shall be sent to the subscriber, and a grace period shall be started that will last for a configurable amount of days (min. 1 day, max. 5 days).

At the end of the grace period, a second attempt shall be made by the service to purchase the Service Bundle. If this attempt succeeds, the Service Bundle subscription shall remain active; if the attempt fails, the Service Bundle subscription for the subscriber shall be deactivated by the system. In both cases a notification SMS shall be sent to the subscriber.

It shall be possible to purchase and subscribe/unsubscribe to/from a Service Bundle via the USMS GUI (Java screens).

It shall be possible to purchase and subscribe/unsubscribe to/from a Service Bundle for a subscriber via the eServ-Global PI.

A subscriber shall be able to purchase and subscribe/unsubscribe to/from a Service Bundle through the IVR self care interface.

Atomic SRM+PromoMax Express

The PromoMax Express license will allow the operator to define a number of counters which may be used for the application of rewards in real time or at the end of each period. Each counter is defined with a name, along with the period which should be used for the promotion—the options which will be provided will be that rewards can be applied daily, weekly, monthly or by yearly basis. The Unit of each counter will allow cash, time or number of events to be used as the criteria of the promotion—so, for example, a counter for talk time each day and a counter for cash spend each month may be configured. The number of events functionality allows counting of the number of calls, SMS, or any other ChargingMax UBE charged services to be tracked.

When each service and rating scenario is defined the counters which should be updated are chosen to give the operator full control over which services will be used as part of the promotion.

The ChargingMax Reward is calculated either at the end of the period during the expiration of the counter or fired in real time during session closing when the reward level is reached. This allows the operator to target short term usage campaigns or alternatively, look at longer term strategies where use over each month or year are used as the criteria of the promotion.

Based on a Reward being reached a Credit reward only may be given.

With a credit reward, credit may be awarded to the subscriber based on analysis of his expenditure. For example, if the subscriber spent 10 E last month on calling they might receive 5E of national talk time credit which may be used in the first week of the next month.

The PromoMax Express service allows the operator to define one Tariff Reward scheme and up to three Credit Reward schemes. The system shall keep track of the expenditure of the subscriber and shall reward the subscriber according to the parameters defined in the reward schemes.

It shall be possible to track expenditure of a subscriber for FRIEND LINK destinations on the following services:

HPLMN MO voice or video calls

HPLMN SMS or MMS MO

A combination of HPLMN MO voice or video calls and HPLMN SMS or MMS MO

The selected services shall contribute to the expenditure tracking in all reward schemes and across all product types.

Expenditure tracking shall be enabled across all product types for all the defined reward schemes.

Expenditure may be tracked through one of the following methods:

cash expenditure tracking: this keeps track of the amount of currency spent by the subscriber on friend link calls time tracking: this keeps track of the call time of the subscriber on friend link calls unit tracking: this keeps track of the amount of calls made/SMS's sent by the subscriber to friend links It shall be possible to configure a different tracking method for each reward scheme. Within a reward scheme, only one tracking method may be used.

Within each reward scheme, it shall be possible to configure the time limit after which the tracked expenditure will be reset. Possible values are: daily, weekly, monthly and yearly.

Up to three Credit Reward schemes may be defined. In a Credit Reward scheme, the expenditure of each subscriber is evaluated against a single expenditure threshold, either in real-time or when the expenditure time limit expires. Depending on the accumulated expenditure value of at that point, one of the subscriber's balances may be credited.

The following parameters need to be provided:

name of the reward scheme tracking method (cash, time, units)

time limit (daily, weekly, monthly, yearly)

contributing destinations expenditure threshold value per product type real-time or not (if not, the reward is given when the time limit expires)

reset expenditure counter after real-time reward (yes or no)

balance type to credit (product type specific)

credit value (product type specific)

credit validity (product type specific)

An advanced SMS shall be sent to a subscriber prior to a reward being given. The operator will be able to define how far in advance this message is sent. Alternatively, a notification SMS shall be sent to a subscriber when a reward is being given.

It shall be possible to view the expenditure of a subscriber via the USMS GUI (Java screens), for example the eServ-Global PI.

Example Promotions

A reward is offered by operator, use an additional 10 E of airtime within 1 month on intra-friend link calls and move to the gold product type. As soon as subscriber uses 10 E on friend link calls he gets moved to gold in real-time and receives an SMS.

Reward—send 300 SMS this month to friend links and receive SMS for free for the rest of the month. Once subscriber uses 300 friend link SMS, he receives a SMS to inform him the reward was reached and that he will now get free SMS till the end of the period.

Rewards—an active friend link user receives a SMS saying 'congratulations, out of your friends, you are the friend that has talked for the longest during the month—you receive free 80% discount on video calls for the month'.

Rewards—individuals can be rewarded based on their amount of invite friend link that they have created. E.g. a friend subscriber can be rewarded for having a certain amount of friend links that he has created, e.g. 100 friend link request that have not been denied. In real-time when the subscriber obtains this amount of friends, the individual friend is rewarded with something.

Rewards—can be given to individuals based on the number of friend links that they create. E.g. make 20 friend link requests this month and receive a reward of 20 friend link SMS.

Atomic SRM Self-Care

The following section refers to all self-care mechanisms available to the subscriber using the SRM Atomic model. Inside the scope of the project the self-care service logic flows will be defined.

Using the IVR mechanism, a subscriber will be able to undertake the following actions specifically in relation to the SRM service only. This is not an exhaustive list as more requirements may be discovered during the SRS phase.

Can listen to details of the service

Can listen to how many friend links a subscriber is permitted to have

Can listen to how many friend links a subscriber has

Listen to the friend link nicknames (if possible) and MSISDNs

Details of the friend link tariff/subscription/service bundle

Listen to available service bundles

Purchase a friend link service bundle

Listen to active service bundles

And any minutes/credits etc that are remaining

Listen to any promotions that are active

And current threshold status

Rewards that are on offer

Atomic SRM Operator Web Portal PI Commands

A subscriber will be able to log into an operator created & managed web site. At registration, each friend is provided with a password that is required to access their account through the operator managed website. The website will interact with the CMX platform using the external PI. Using the website, a user will be able to manage their friend links and view information regarding their account and SRM promotions.

It will be possible to create PI commands for the following actions:

A registered subscriber can log in using their nickname/MSISDN & password assigned during the registration process A logged in subscriber can view their friend links (nickname & MSISDN)

A logged in subscriber can view their current balances

A logged in subscriber can view their friend link tariff/discount

A logged in subscriber can view their friend link service bundle options

A logged in subscriber can view their PromoMax Express balances—current situation and targets in order to reach rewards etc A logged in subscriber can view their maximum number of friend links permitted (if defined) & their current amount of friend links A logged in subscriber can remove friend links To remove a friend link the subscriber simply needs to select the friend links to be removed and then to confirm this action. When a friend link is removed, an SMS will be sent to the subscriber removing the friend link and an SMS will be sent to the removed friend. These SMS will be as per the remove subscriber process.

Atomic SRM Command List Alternatives

For each SMS command, it is likely that subscribers will sometimes not input quite the correct word. For example, if the command action is STOP and the subscriber enters STP, it will be possible for the operator to define as many alternatives to the command word as possible and for each command.

SRM OpenSocial Model it is possible to develop an application to run across multiple social networking sites. The applications described herein can be installed by a user inside the portals of the networking sites and interface with the flexible ChargingMax platform (CMX).

The SRM Application

Applications developed by the SRM have the possibility to be launched across social networking sites using the OpenSocial API. The applications will give the possibility for subscribers to enter their mobile telephone number into the application. The application will then fetch 'friend' information for each user that has the application running and has installed the relationship. Therefore, friend relationship information will be automatically linked. The SRM application will then interface with the CMX platform, communicating this friend relationship information and corresponding MSISDNs. The CMX platform can then run control logic on these relationships. For example, 2 people that are both friends on the same social networking site have this application installed, when they call each other the cost of the call will be rated according to a SRM tariff or discount. The application will be operator specific, e.g. only for Orange UK subscribers.

The social networking site application will update the friend relationships and mobile numbers with the ChargingMax platform as and when changes are made. Friend relationships are kept up to date in real time. This will use the external PI.

Application Design

The main concept around the SRM application will be as follows:

Users on a social networking site using the OpenSocial API will be able to install an application seen to be from an operator, e.g. a user on MySpace will be able to install an Esg-Tel application.

Upon installation of the application, a user will need to enter their MSISDN in order to receive any benefit from the application.

When the MSISDN is entered, a user will be able to see their 'friends' from the social site that also have the application installed. The application will not show the MSISDNs of the friends, unless specified by individual users.

The application will communicate with the CMX platform and keep up to date records of MSISDNs and corresponding friend relationships.

When MSISDNs entered into the application call other MSISDNs entered into the application, the SRM will associate this friend link and apply some type of logic to the control flows such as an 'Open Social' discount.

The service will be limited to on-net numbers only—if off-net numbers enter their MSISDNs and they are not from the on-net operator, they will be removed from the application. To do this, the SRM will check the number to be on-net/off-net and if the number is to be removed from the application, the user will be sent a message to explain the reasons for this.

Application Overview Screen

It will be possible to install the SRM application very easily. On Social Networking sites, it is possible to search for applications that are available on their site via a GUI. In order for a user to view more details of the SRM application, the subscriber must simply click on the requested application displayed on the GUI.

The SRM application will present the user with a page that gives an overview of the application. It will be able to include information such as:

Application name

Description of application and how it works

Friends that have the application installed

And an option to install the application

A rating for the application

The final look and feel of the application screen should be implemented to be operator definable. This means that the operator will be able to use branded logos, image font size and colours etc.

Installation Procedure

When installing an application, a user is presented with installation options For example a user can selected to allow the application to perform any of the following tasks: 'know who I am and access my information', 'put a box in my profile', 'place a link in my left-hand navigation', 'publish stories in my news feed and mini-feed', 'place a link below the profile picture on any profile' and 'send me notifications via email'.

The SRM will have a final button which can be pressed in order to install the application.

Post Installation Application Main Page

The application main page will give full details of the application. In order for the service to become active, a user must first enter their phone number. Normalization rules will apply.

Once the subscriber has entered their mobile number the application will be active. The application will fetch information on the users' friends who also have the application running. The subscriber will be able to see from a list all of their friends on the social networking site in question that also have the application running. So that when they call each other, they receive some kind of reduced call through a tariff or discount.

It will be an option that a subscriber can select so that no other person can see their telephone number displayed. On the other hand, it will be an option to have this number displayed—of course, only 'friends' will be able to see this number.

SRM Application Update

The CMX platform will keep an up to date record of all friend relationships that have the SRM application installed. Every time a new user installs & activates the application an update will be sent to the CMX platform. The CMX platform will be sent the information from the application and will take the MSISDN and check the HLR to see if the MSISDN is an on-net number. The SRM platform will check all numbers that have installed the application to make sure that the number is an on-net number.

If the number is on-net the application will be active and the CMX platform will associate a friend link relationship between all of the subscriber's friends on the social site that have the application running Friend links will be updated if new subscribers add the application or if subscribers remove the application.

If it is not an on-net number, the CMX platform will interact with the SRM application so that through the application, a message can be sent to the off-net subscriber. It will say something along the lines of: 'The SRM application is for esgTel subscribers only. Unfortunately you are not a esgTel subscriber and consequently cannot benefit from the esgTel application benefits.' The operator can then define a message inviting the subscriber to switch networks.

Searching for Friends from Different Social Network Sites

Using the application, it will be possible to make friends with subscribers from other social network sites that have the application running A user will be able to search for members from other social sites that have the application running and make friends with them within the application so that they can benefit from the application benefits. This friend relationship will be restricted to the SRM application only.

Application Benefits

The SRM allows preferential rates to be activated when calling another subscriber to which a friend link has been created. When calling another friend link, a discount could be received, for example 20%. The operator must define which services are to be included in the scheme, such as voice calls or SMS.

The tariff/discount that are applied for a subscriber will be dependant on the product type that is defined. For example, an operator may have 3 separate product types: bronze, silver and gold. The friend link tariff is defined as the following:

| Type of Use | Bronze | Silver | Gold |
|---|---|---|---|
| Friend link SMS | 10 cent | 7 cent | 3 cent |
| Friend link MMS | 20 cent | 15 cent | 8 cent |
| Friend link Voice call | 10 cent per minute | 7 cent per minute | 3 cent per minute |
| Friend link Video call | 30 cent per minute | 25 cent per minute | 15 cent per minute |

Due to the fact that there is no charge for activation of the service and the fact that a subscriber can create friend links with an unlimited amount of subscribers this potentially is a way for the operator to give away cheap calls on every call a subscriber makes—this is because a subscriber could create a friend link with every on-net friend on their social networking site—it is not uncommon for many people, especially the youth, to have 500+ friends. In order to avoid this scenario there are 2 solutions available to the operator;

Apply a charge/subscription for the friend link tariff. For example, a subscriber has 30 friend links with people who he calls on a regular basis. He decides to pay the subscription for the above tariff monthly so that when he calls his friend links, he gets cheaper calls. He is also encouraged to create more friend links. When he makes a call to a number that is not a friend link, his normal tariff rules and balance cascades apply, i.e. it is not a friend link call.

Purchase an intra-friend link service bundle. Much like intra-social group service bundles. Service Bundles allow a subscriber to convert purchased credit into credit which is available for use with a specific service. A simple 'Intra-friend link bundle' example is where the user can purchase a package of 1000 SMS for use to intra-friend links within the next 1 month for only 10 EUR. The operator can define a range of service bundles on offer, for example:

| Type of Use | Light Friend Talker Service Bundle | Medium Friend Talker Service Bundle | Socialite Friend Service Bundle |
|---|---|---|---|
| Intra-friend link voice | 50 minutes | 100 minutes | 200 minutes |
| Intra-friend link video | — | 20 minutes | 50 minutes |
| Intra-friend link SMS | 50 SMS | 150 SMS | 300 SMS |
| Intra-friend link MMS | — | 10 MMS | 50 MMS |

A subscriber can purchase a service bundle through the application. The application will interact with the CMX/SRM platform in real-time, i.e. to check to see whether the subscriber first has enough money to purchase the service bundle, and secondly to deduct this credit from the subscribers account. An SMS confirmation will be sent to the subscriber's numbers: Either confirming the purchase of the service bundle or Explaining it was unsuccessful and the reason for this such as insufficient credit A subscriber can view/purchase as a one shot/subscribe to a service bundle via the self-care mechanism or through the eServGlobal PI.

Having friend-link service bundle functionality means that the operator can control the amount of revenue or discount that is given away through friend link calls. The operator can define, if desirable, a maximum amount of service bundles that can be purchased by an individual subscriber every month.

It can also be defined that there is no separate tariff or discount for friend link calls/usage. Instead, the subscriber must purchase a friend link service bundle. Once he has consumed this friend link service bundle, the subscribers' normal tariff will be applied for all calls/SMS, even if it is a friend link call—that is until the subscriber purchases another friend link service bundle in which case the cost of the call would be deducted from the friend link service bundle.

The application will give full details of the service bundles on offer and will also give full instructions of how to purchase this service bundle—namely through the application or by following the instructions the application will give for the self-care mechanism that a user can access from their phone.

Once CMX platform has friend link relationship information and corresponding MSISDNs, it will be possible to define separate discounts or tariffs as with the Atomic model. Specific requirements can be defined during the SRS phase but in principle will work in the same way.

Once CMX platform has friend link relationship information and corresponding MSISDNs, it will be possible to define service bundle functionality as with the Atomic model. Specific requirements can be defined during the SRS phase but in principle will work in the same way.

Mobile Upload

It will be possible for friends to upload photos or video taken from their mobiles so that these can be displayed on the application. This will be very easy for the subscriber to do—he will simply need to send it to a short code. The SRM will then upload this to the application to be viewed from the social networking sites. The photos will only be seen by 'friends' that have the application running.

The benefit of this application is firstly for the operator—here they are using the social network sites to display their customers' photos which will be able to be seen from subscribers across multiple social networking sites.

Secondly, the subscriber can upload photos/videos at any time—that is to say that a subscriber could be on a crazy night out in town—big reunion of friends and they take photos which brings them great amusement. The subscriber can then send the photos to a short code there and then, and have the photo waiting on the application for the next morning when they wake up for all friends with the application running to see. Of course, for the social networking site they are benefiting also from having active users on their site.

ChargingMax Platform

Figure 8:
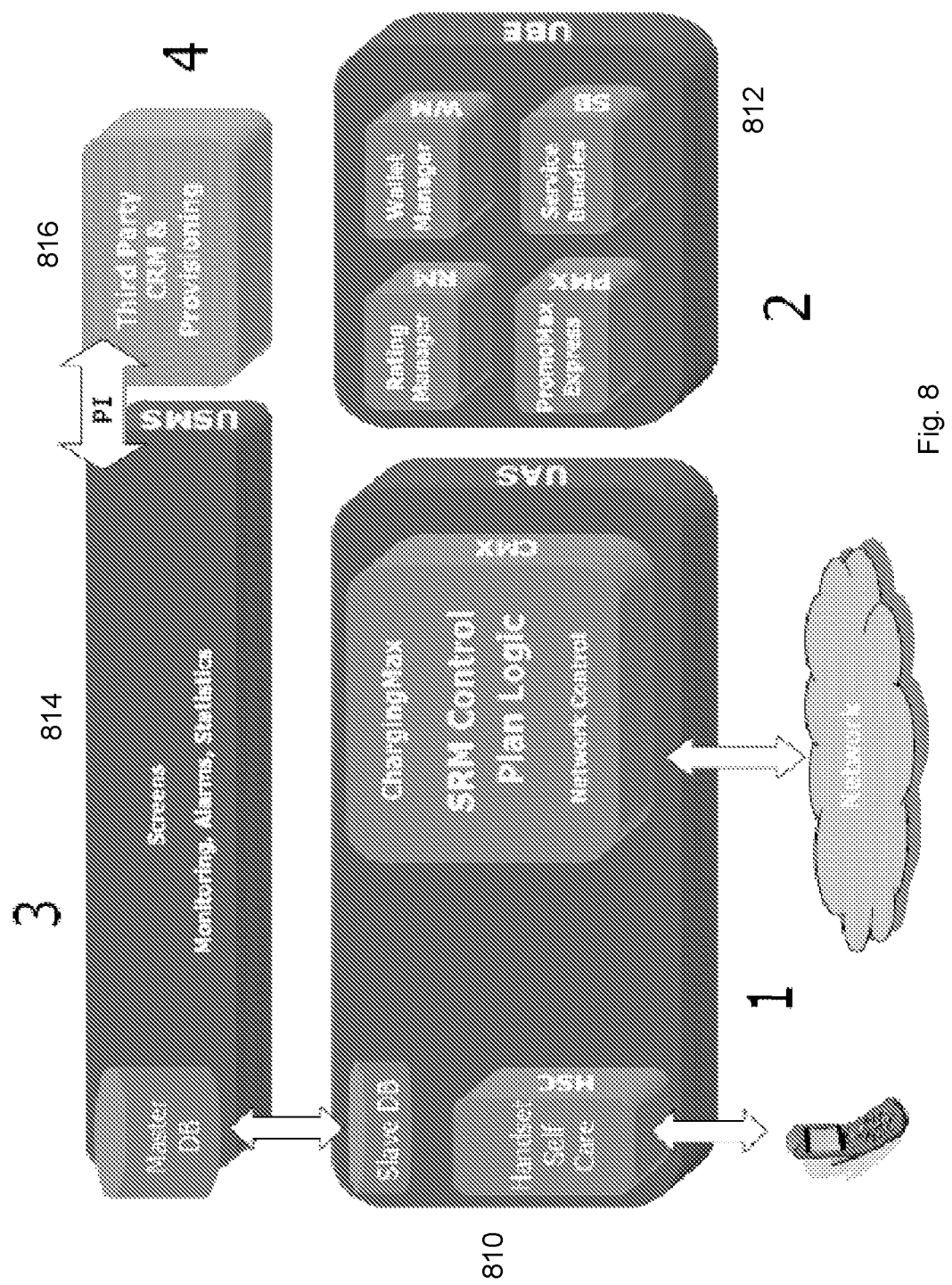
FIG. 8 illustrates one embodiment of a ChargingMax system.
Figure 9:
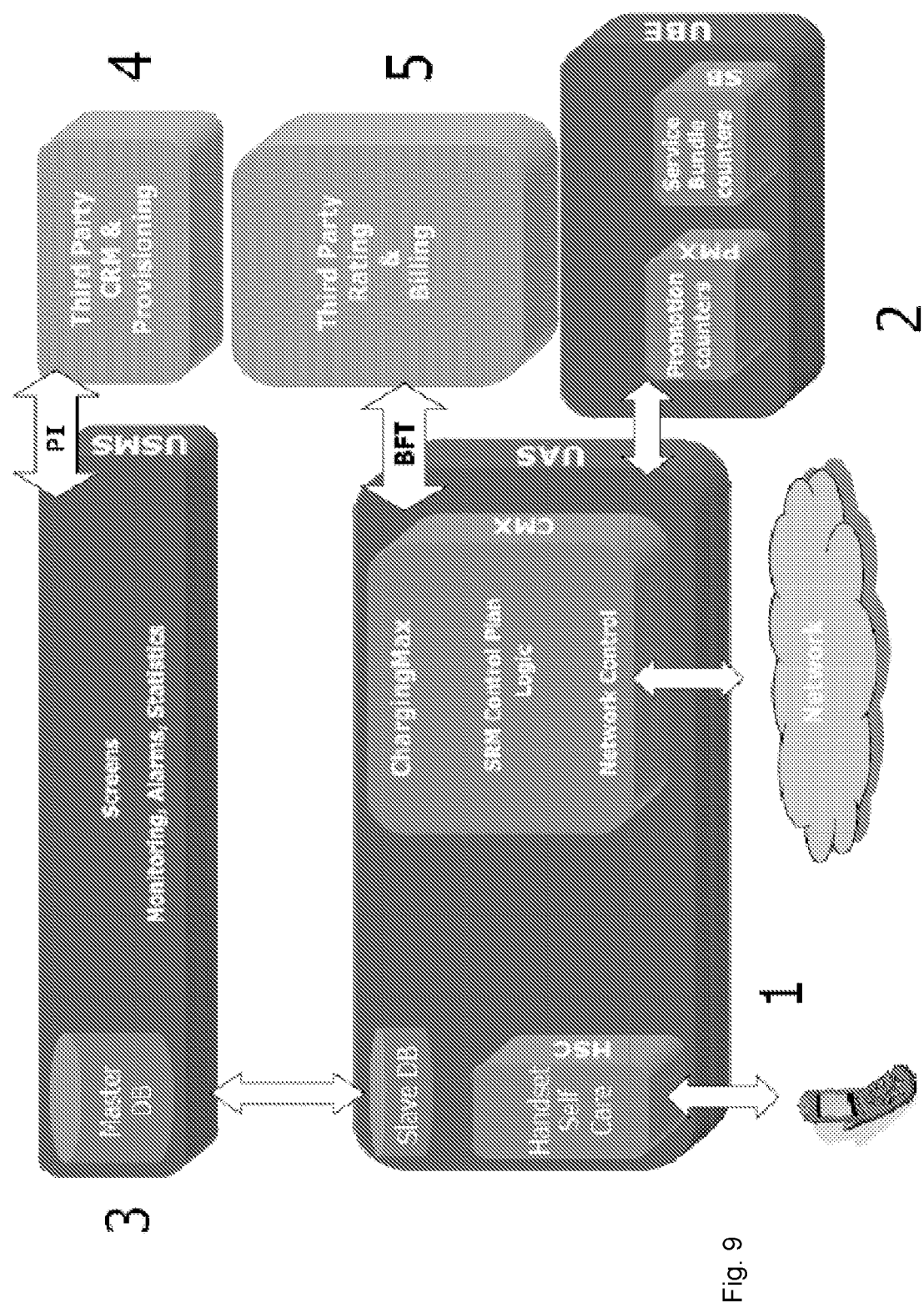
FIG. 9 illustrates a further embodiment of a ChargingMax system.

As described above, the system may implement a platform to manage and control aspects of charging users for the services that they access. One embodiment of the system, which may be termed the ChargingMax platform, is described below. One embodiment of a ChargingMax system is illustrated schematically in FIG. 8, including a Universal Application Server 810, a Universal Billing Engine 812, a Universal Service Management System 814 and a system for Third Party Rating and Management of Subscribers 816. An alternative embodiment, in which Third Party Rating and Billing is provided is illustrated in FIG. 9.

The platform is implemented to enable a differentiated Online Charging System, hybrid convergence and calling card services. The ChargingMax Convergence product allows the operator to connect GSM, fixed, CDMA and NGN networks in real-time to a billing system—providing subscriber and operator VAS. This component allows dynamic subscriber data to be defined and used in advanced Online Charging System services, depending on the operators' needs. The Universal Billing Engine (UBE) provides the rating, wallet and voucher management for voice, video, data and SMS charging.

The solution is deployed with minimal integration effort using existing interfaces, helping to rapidly launch new services and enabling the operator to derive higher average revenues per user (ARPU).

The system may be used to build a range of service offerings for customers that include: Operator defined Subscriber Centric VAS, Service Personalization—Friends and Family, Favourite Destination, Buddy List, etc., Location Based Services—Home Zone, FMC simulation and Voucher Bundles—Purchase services with vouchers.

In addition, the ChargingMax suite can also enable: PromoMax Express, Peer-2-Peer credit transfer, Service Bundles, Subscriber Profile Manager, Control Plan Editor. Additional licenses such as these allow the operator to customize the package based on market expectations within specific territories.

Management of ChargingMax is achieved through comprehensive and detailed TMN FCAPS functions: Fault, Configuration, Accounting, Performance and Security Management. These are provided by the Universal Service Management System.

ChargingMax can be installed in fixed or mobile networks in both circuit and packet-switched infrastructure (including SIP networks). In one embodiment, ChargingMax is deployed on a range of standard Sun application server hardware with Solaris operating systems.

The ChargingMax Online Charging System solution provides prepaid functionality for subscriber centric wireless, wire line and NGN networks. By offering these network interfaces in parallel, the IMS dream may be fulfilled using today's technologies. Furthermore, the operator always has the option to seamlessly migrate the solution into a Convergent architecture.

As a first step towards convergence many operators are deploying hybrid Online Charging System solutions. This economically viable option allows operators to capitalize on the Online Charging System architecture with close integration with a post-paid partner. Essentially the Online Charging System solution remains in place to offer real time services and credit control but pre-rated EDRs are sent to the off-line charging system for bill production and management of the post-paid fee collection and dunning.

ChargingMax Convergence allows the operator to connect the network elements to the online charging system, acting as a Value Added Services (VAS) gateway. By either storing locally or collecting subscriber information from external Subscriber Data Functions (SDF), the solution provides a graphical environment for new services to be created.

ChargingMax Packaged Solutions have been developed using predefined technology, resulting in a solution which is competitively priced for both a revolutionarily low subscriber base through to several millions. It uses commoditized technology and focuses on selling marketing expertise with choices of selectable services and features ready to be implemented into a system from The Services Library. The ultimate result is a highly valuable and functional system with a very fast ROI.

The SRM Standalone solution described herein enables the advanced and cutting edge VAS capabilities of ChargingMax to be made available to a 3rd party IN. This allows a common deployment of the SRM across a regional or worldwide group.

In preferred embodiments:

ChargingMax evolves with the operator's needs for the market—The platform allows additional services and features to be defined using the Control Plan Editor to allow the operator to create new promotions and features. This eliminates the need to invest in supplementary systems and software, and allows conservation of the ChargingMax investment.

ChargingMax is reliable—As a telecommunication provider, the quality of service which is received by the end consumer has a dramatic effect on the perception in the market. ChargingMax offers a fully redundant architecture with options for site redundancy and disaster recovery platforms.

ChargingMax is a network agnostic—Simultaneously providing GSM, CDMA, wire-line, SMS, data and NGN IP connectivity for 2G and 3G networks. Supporting core network equipment from most vendors the system is independent and can be used even in multi vendor environments. If the network evolves to embrace new technologies then choosing a homogenous service platform which supports the network migration is a must.

ChargingMax offers a path to convergence—Every operator must consider moving towards some kind of convergent billing solution. If a pure Online Charging System or hybrid convergence is not the right choice for the operator, the same software and equipment can be used to support a convergence architecture with a 3rd party billing solution. Existing services and subscriber data are preserved to remove any impact to the end customer.

ChargingMax is scaleable—An increase in traffic often means the simple acquisition of software licenses. If supplementary hardware is required this may be added as part of a turn-key upgrade without requiring migration or service outage.

ChargingMax is easy to operate—Supervision and management of the ChargingMax system is made easy with a web based graphical management system. Supervision is provided either by the built in NMS functions or integrates into a larger supervision system using industry standard protocols.

ChargingMax is a building block—Pre-integrated with other first class Value Added Service platforms, the operator is able to deploy a full range of Charging, Top up, Messaging and Next Generation Services.

ChargingMax is a product—Regular investment means that eServGlobal aims to make two product funded releases each year. This means that the operator is able to take advantage of charging trends on a global basis as well as having a channel for development of locally needed features. User groups and marketing workshops can supplement the operators own research and imagination.

ChargingMax is dynamic—Giving the operator the tools to define the data stored for each subscriber and the way this influences the end service enables the operator to achieve true flexibility and a unique market position.

ChargingMax is open-ended—Using the graphical Control Plan Editor, the charging services which may be deployed on the platform are limited only by the imagination of the operator.

Figure 10:
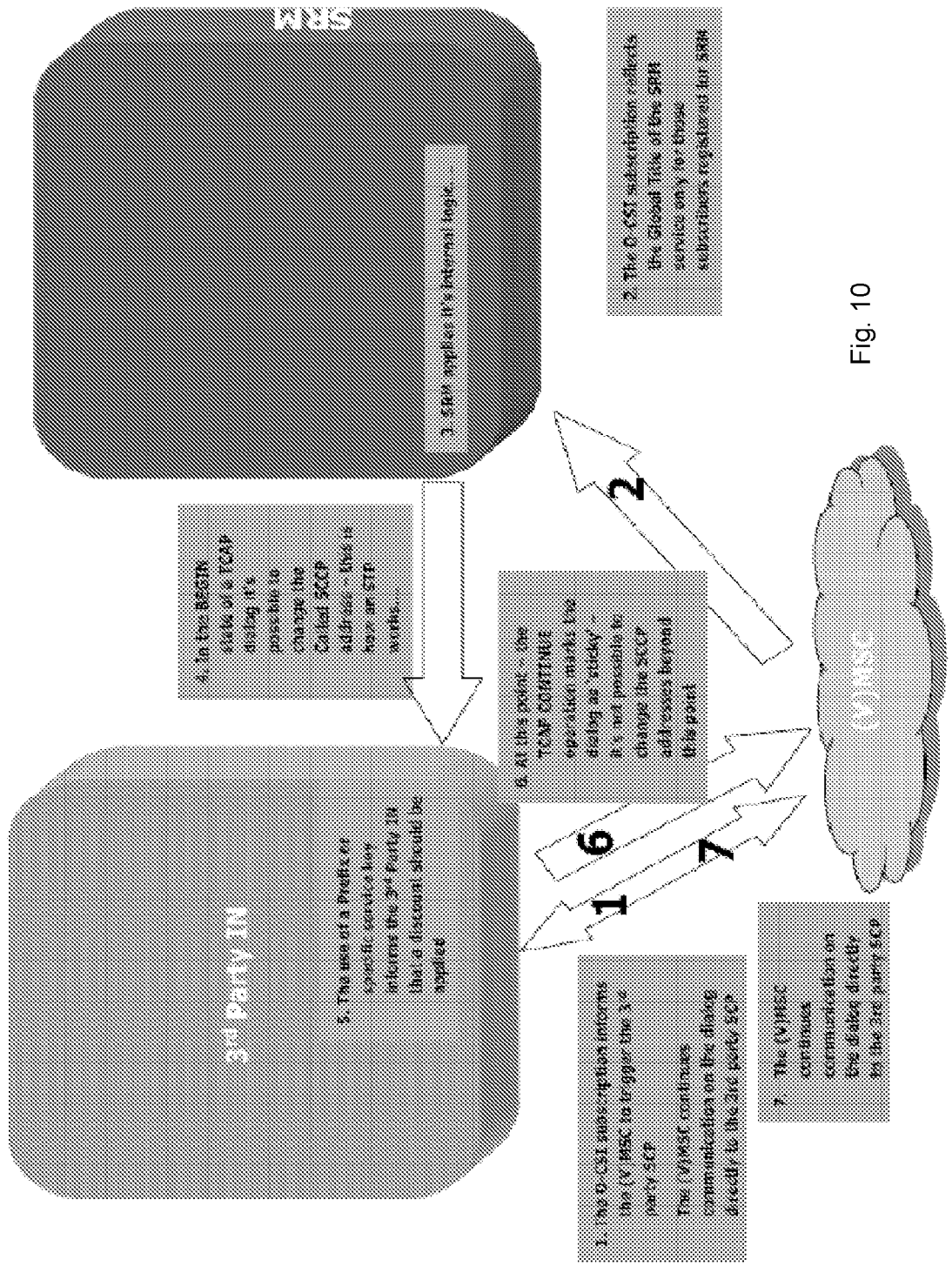
FIG. 10 is a schematic diagram of a charging system for a voice call according to one embodiment.
Figure 11:
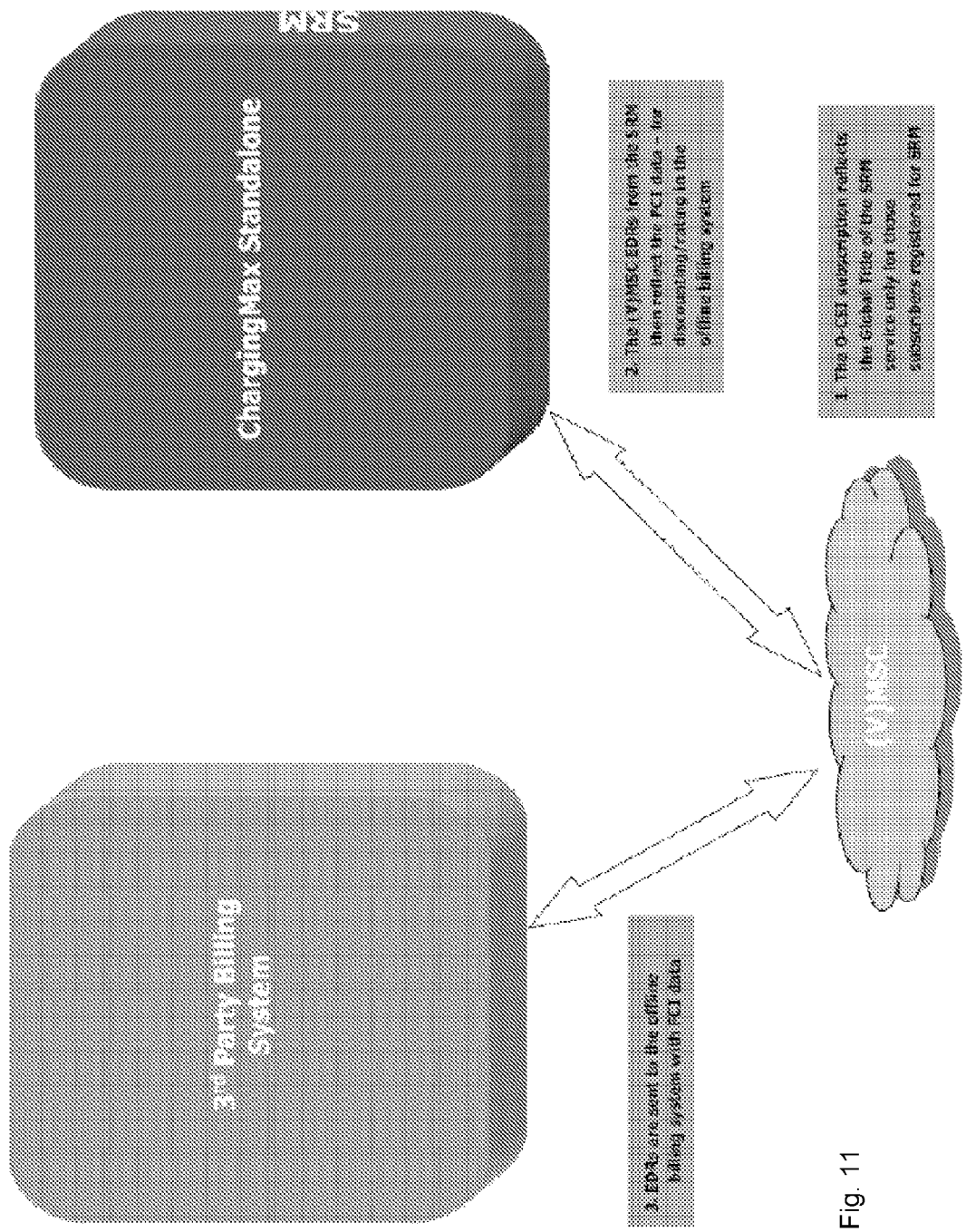
FIG. 11 illustrates a post-paid voice call according to one embodiment.

The charging, call control, management of subscribers and other operations may be carried out by a separate or third party module. In this scenario, the present system may be used in a "service node" configuration, where it is triggered during call setup for tracker analysis. A prefix or FCI may be added to the Connect operation before call handover to the standard charging platform following a friend link call. FIG. 10 illustrates schematically an Online Charging system voice call using a prefix and the steps are summarised below:

1. The O-CSI subscription informs the (V)MSC to trigger the 3rd party SCP. The (V)MSC continues communication on the dialog directly to the 3rd party SCP
2. The O-CSI subscription reflects the Global Title of the SRM service only for those subscribers registered for SRM
3. SRM applies it's internal logic . . . .
4. In the BEGIN state of a TCAP dialog it's possible to change the Called SCCP address—this is how an STP works . . . .
5. The use of a Prefix or specific service key informs the 3rd Party IN that a discount should be applied
6. At this point—the TCAP CONTINUE operation marks the dialog as 'sticky'—it's not possible to change the SCCP addresses beyond this point
7. The (V) MSC continues communication on the dialog directly to the 3rd party SCP FIG. 11 illustrates a post-paid voice call using an FCI. In summary:

1. The O-CSI subscription reflects the Global Title of the SRM service only for those subscribers registered for SRM
2. The (V) MSC EDRs from the SRM then reflect the FCI data—for discounting/rating in the offline billing system
3. EDRs are sent to the offline billing system with FCI data Referral Scheme When a subscriber makes a friend link request, it is possible to combine this with the intelligent referral scheme and benefit from the Social Relationship Manager concepts. This enables an acquisition and/or anti-churn campaign to be deployed out of an operator existing customer base, leveraging value from sticky relationships. The referral scheme allows existing subscribers to refer their friends. This is a very powerful process—the subscriber can persuade his friends to switch networks and the motivation for the subscriber to refer his friend is that by doing so, he will receive a gift from the operator; such as free talk time if the friend switches networks.

When a friend link is sent from a registered subscriber to an off-net subscriber, the following example SMS can be sent:

To on-net subscriber: "Friend link is now formed with 07973 232 957 from operator OtherTel. Friend link tariffs now apply with this number. If your friend ports their number to eServGlobalTel you will receive 200 minutes of friend link calls. Your friend will also receive a welcome present . . . ."

To off-net subscriber: "Colin Berwick 07963 498 384 from eServGlobalTel has sent a friend link. When Colin Berwick calls you they receive cheap calls. If you port your 07963 498 384 number to eServGlobalTel we'll give you a welcome present of 5 Euros for every eServGlobalTel friend that creates a link with you (maximum 20 Euros). We'll also credit Colin Berwick if you join us. Call 07967 473 384. To stop receiving these requests reply STOP (free of charge)"

Here, details of the referral reward can clearly be visible to both parties. It is likely, through viral marketing, that the on-net subscriber will try to persuade the off-net party to switch networks. The SRM has a fully automated process for this to happen and for both parties to be rewarded when an off-net subscriber becomes on-net. When an off-net subscriber who has been referred and added as a friend ports their number they will immediately benefit from a referral reward. This will be applied by a simple BPL (Business Process Logic) which will be applied according to the operator's port-in process. For instance, a reward could be applied for switching networks after a first call or when the first recharge above a certain amount has been made—at this point, each of their friends will also receive a small reward for their referral. The rewards that can be applied are based upon voucher types that can be created for the SRM service.

An SMS will be sent to the friend stating that they received a reward because one of their friends ported their number to the operator. It will include; both nicknames; the ported-in subscriber's MSISDN; the name of the voucher type and a description of the reward (such as balance and days until balance expiry). An example SMS can be as follows: "Thanks <nickname>. Your friend <nickname> <MSISDN> has joined eServGlobalTel. We're all now friends. Please accept a gift of <300 minutes of friend link calls> to be used within the next <new balance expiry period in days> days"

Finally, an SMS will be sent to the ported-in subscriber stating that they have received a referral reward; it can include their nickname, the count of their friends that also received the reward, the name of the voucher type and a description of the reward (such as balance and days until balance expiry). For example: "Welcome to eServGlobalTel as recommended by <count of friends> of your friends! Have a gift of 20 Euros credit, to expire after one month. By the way, each friend link also received a gift. To register to the SRM Promotion and receive cheap calls to your <number of friends> friends please send an SMS with your nickname to 121 (20 characters or under) at a charge of <initial charge> and subscription charge of <subscription cost> per month"

PromoMax Express

In order to reduce churn, operators can reward their customers based upon their consumption habits. This is only possible when trackers are put in place to watch the various service usages, a function performed by the Promotion Management feature of the UBE. In a ChargingMax Convergence mode, a UBE must also be deployed however it will be to performing the promotional counter functionality only. The rating and other functions will still remain with the 3rd party OCS. In some embodiments, Service Bundles may be given as rewards.

When the SRM is combined with PromoMax Express, rewards can be given to subscribers based upon the following criteria: Friend link calls/SMS and Revenue spent on friend link calls. SRM Business Intelligence can be used in conjunctions with PromoMax Express to reduce churn; by highlighting valuable influential subscribers.

The advanced ChargingMax logic allows rewards to be applied in real-time. That is when a subscriber reaches a reward, they immediately receive the reward. This is a powerful instrument due to the fact that the subscriber needs to understand why they have been rewarded in order to reduce churn. By applying the reward at the time of reaching the reward, the subscriber is fully aware why they have been rewarded.

The service can also be defined so that rewards can be applied at the end of a given period. However, as explained above, its important for the subscriber to understand why they are receiving the reward—even if the reward is given at the end of the period, the subscriber can still be made aware of reaching a reward threshold by receiving a notification SMS explaining so.

The operator is also able to set the expenditure period very easily. This can be daily, weekly, monthly or yearly allowing many different anti-churn promotions to be defined, with different promotions targeting different segments of the customer base.

When a non real-time reward is given to a subscriber, such as when an SRM balance threshold is reached, the billing engine plug-in will apply the reward directly to the subscriber's wallet. Rewards are applied by sending a voucher type recharge to the convergent Online Charging System.

IVR Self-Care

Having an end-to-end self-care mechanism for the subscriber brings a great cost reduction to the operator—there's a reduced need to call customer services. The less time a CSR agent spends on resolving customer problems allows the operator to benefit from greater cost savings. Furthermore, if a subscriber can solve his own query or problem very easily without having to call customer services, this will lead to a much more pleasing end user experience.

When a subscriber dials into the Interactive Voice Response (IVR) self-care, the SRM will first check that the subscriber is registered to the service. If they are not, they will be informed how to register, any costs etc, and will be disconnected from the IVR. For registered subscribers, they will hear a fixed welcome announcement and a set of options to choose from, for example:

The first option allows a subscriber to hear how many friends they are allowed to have based upon their product type The second option allows a subscriber to hear how many friends they currently have in their friend list The third option allows the subscriber to hear the MSISDN for each of their friends The fourth option allows the subscriber to hear the current tariff or discount that applies when they make an SRM call. If different tariffs apply depending on the friend list size then the current size of the friend list will be used to select from a fixed set of tariffs The fifth option plays information about the SRM specific service bundles. A new feature node plays the announcement IDs associated with service bundles in name order; the service bundles selected will be those associated with the subscriber's product type The sixth option will play the SRM PromoMax Express balances and targets After all options have been played, the subscriber will be disconnected from the IVR system.

Figure 6:
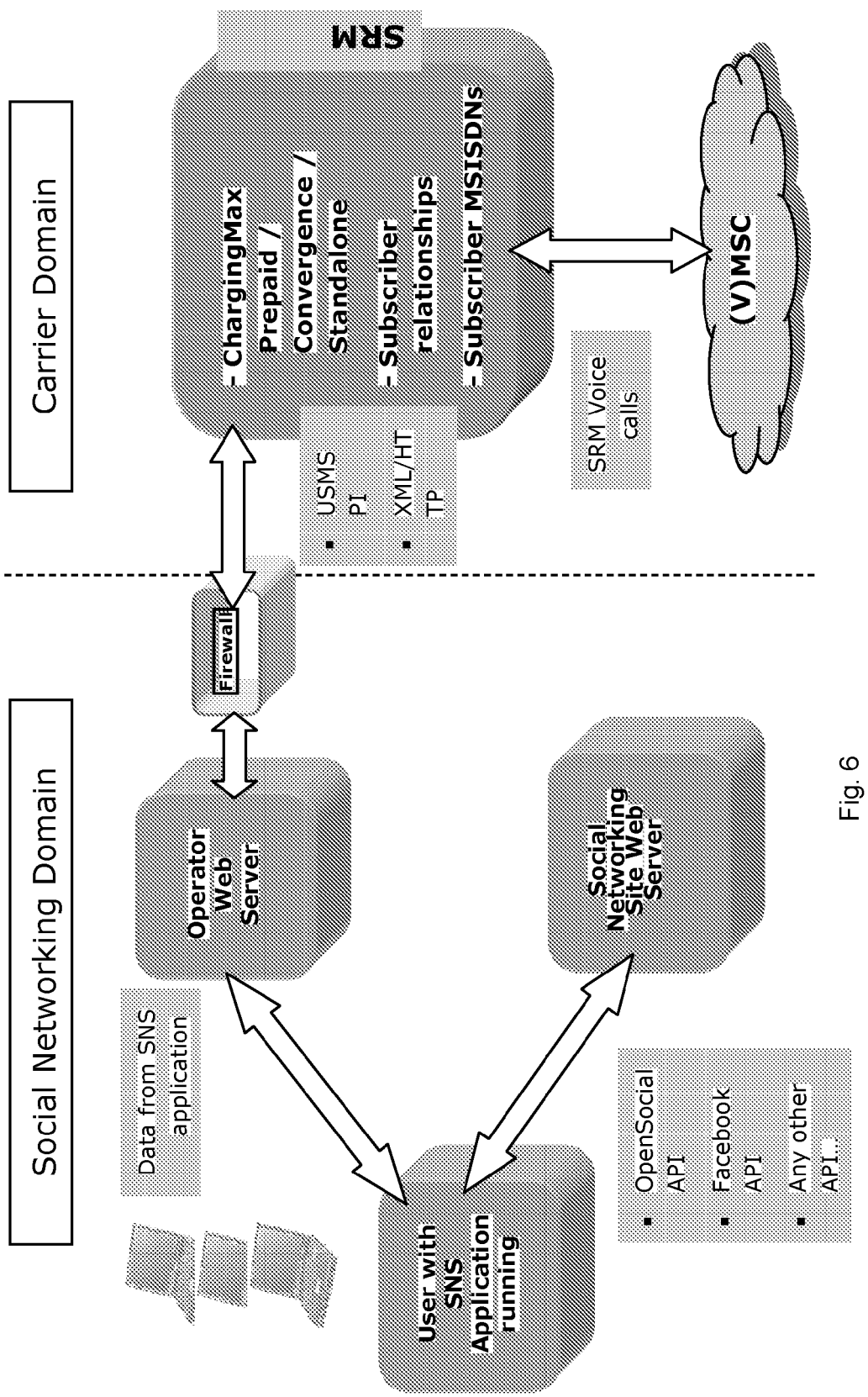
FIG. 6 illustrates one embodiment of an architecture of a system described herein.
Figure 7:
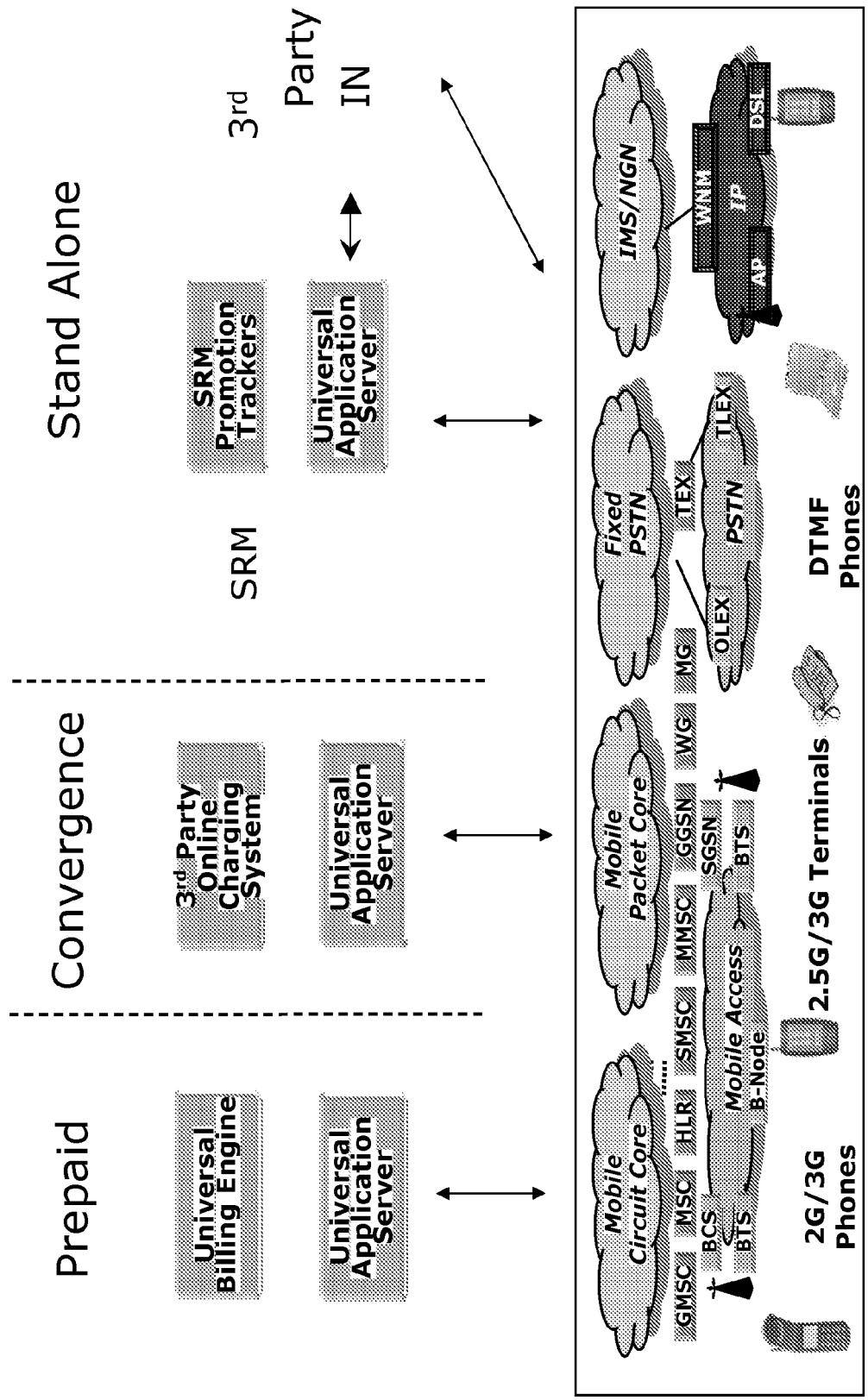
FIG. 7 illustrates an alternative embodiment of an architecture for the present system.

FIG. 6 illustrates one embodiment of an architecture of a system described herein. FIG. 7 illustrates an alternative embodiment of an architecture for the present system.

Click to Call

In conjunction with any of the embodiments described above, a "click-to-call" interface may be provided via a web interface, for example via an application on a social networking site. A user who has access to the service, for example who has installed the application, clicks on an icon representing a friend that they wish to call, or selects the friend from a list, on the web interface. A call is then set up between the users. For example, the system may first call the requesting user on their mobile telephone and, when the first user answers, call the second user to connect the users. To the second user, the call may appear to originate directly from the first user. However, since the call has been set up via the present application, one or both users may benefit from preferential call rates. The call may be transmitted entirely over the mobile telecommunications network, but may also be offloaded onto another network, for example a VoIP network, at least in part.

Since the present system stores the MSISDN of all registered users, including the first and second user, the first user can contact the second user on his mobile telephone without knowing the MSISDN of the second user. In this case, the connection is set up simply on the basis of the first user's 'friend' link with the second user on the web interface.

In one embodiment, the system connects the first and second users via the telecommunications network, but hides the MSISDN of the second user from the first user, and preferably vice versa. In another embodiment, the system may connect the first user in a first network (for example an IP network) to the second user in a second network (for example a telecommunications network). That is, a first user at a computer terminal may be connected to a second user at a mobile terminal.

In another embodiment, the first user may access his friend details on his mobile terminal (for example a web-enabled mobile telephone) and request a "click to call" connection directly with a friend from his mobile terminal. The present system will then connect the first and second user's mobile terminals. Thus the system may appear to the first user to be very similar to calling a friend from the address book on his mobile terminal but, rather than storing the telephone number of the second user, the friend link is sufficient to enable a connection between users.

This feature provides the additional advantage that users may change their MSISDN numbers and update only their settings for the present application. Other 'friends' who are connected to them via the application can contact them using the "click to call" functionality described here without having to update their own address books with the user's new contact details and even without having been informed of the user's new number. This may allow a user to change his contact MSISDN number on a regular or temporary basis, for example if he has temporarily lost his mobile telephone or if a landline number is more convenient at a particular time.

Implementation

A particular embodiment of a terminal 700 via which a user can access the system can be implemented using a processing system, an example of which is shown in FIG. 4. In particular, the processing system 710 generally includes at least one processor 720, or processing unit or plurality of processors, memory 712, at least one input device 714 and at least one output device 716, coupled together via a bus or group of buses (not shown). In certain embodiments, input device 714 and output device 716 could be the same device. An interface 718 can also be provided for coupling the processing system 710 to one or more peripheral devices, for example interface 718 could be a PCI card or PC card. The interface 718 may also comprise a modem or network adaptor, for example an Ethernet card. The memory 712 can be any form of memory device, for example, volatile or non-volatile memory, solid state storage devices, magnetic devices, etc. The processor 720 could include more than one distinct processing device, for example to handle different functions within the processing system 710.

Input device 714 receives input data from a user and can include, for example, a keyboard, a pointer device such as a pen-like device or a mouse, audio receiving device for voice controlled activation and internet telephony such as a microphone, data receiver or antenna such as a modem or wireless data adaptor, data acquisition card, video receiving device such as a web camera etc. Input data could come from different sources, for example keyboard instructions in conjunction with data received via a network. Output device 716 produces or generates output data and can include, for example, a display device or monitor in which case output data is visual, a printer in which case output data is printed, a port, for example a USB port, a peripheral component adaptor, a video and/or audio output device, a data transmitter or antenna such as a modem or network adaptor, etc. A user could view data output, or an interpretation of the data output, on, for example, a monitor or using a printer.

In use, the processing system 710 is adapted to allow data or information to be stored in and/or retrieved from, via wired or wireless communication means, the local memory 712 or remote databases via a network to implement the methods described herein. The interface 718 may allow wired and/or wireless communication between the processing unit 710 and peripheral components that may serve a specialised purpose. The processor 710 receives instructions as input data via input device 714 and can display processed results or other output to a user by utilising output device 716. More than one input device 714 and/or output device 716 can be provided. Input data may be received from and output data may be sent to a remote server 724 or a cluster of servers via a network 722 which may include the Internet, connected to the interface 718. It should be appreciated that the processing system 710 may be any form of terminal, server, specialised hardware, or the like and is not limited to the embodiment shown.

Processing system 710 is adapted to communicate with other terminals or with one or more servers 724, for example a database server which is connected to a plurality of databases 726a, 726b, by sending and receiving data via a network 722, thereby facilitating communication of data. The remote server 724 may comprise a single server or a cluster of servers, which may be geographically remote from each other, for example being implemented as a "cloud". The server(s) 724 may be standalone devices implementing the system described herein or the described system may be implemented on a portion of the server(s) 724, which may also provide other functionality, for example by serving other web-based applications. For resiliency and redundancy, the servers 724 are preferably separated geographically and topographically.

The server(s) 724 are connected to at least one database and preferably a plurality of databases 726a, 726b. The databases 726a, 726b may also be provided in cluster or "cloud" arrangement and are preferably also geographically and topographically separated over the network 722.

It will be clear to one skilled in the art that the systems and methods described herein may also be implemented using other types of physical equipment and the description above is not intended to be limiting. For example, the user terminal 700 may be replaced by a hand-held unit, such as a laptop, PDA or mobile telephone, providing similar functionality.

The invention claimed is:

1. A method of providing a telecommunications link between a first user and a second user in a telecommunications network, the method comprising:

receiving in the telecommunications network, a call setup connection request from the first user to provide a telecommunications link to the second user over the telecommunications network, the telecommunications network being a mobile telephone network to which the first and second users are subscribers;

determining, based on information from a remote server hosting an external and independent networked community of users in which users interact over a social group platform external to and independent of the telecommunications network, whether the first user and the second user have a pre-existing, specified relationship to each other in the external and independent networked community of users, wherein said determining comprises, sending a request from the telecommunications network to said remote server, wherein said request includes an identifier of the first user and an identifier of the second user, receiving, at the telecommunications network, relationship data from said remote server responsive to said request, and analyzing, in the telecommunications network, said relationship data received from said remote server to determine whether the first user and the second user have the pre-existing, specified relationship to each other in the external and independent networked community of users;

establishing the telecommunications link in the telecommunications network between the first user and the second user; and specifying a billing policy setting for the telecommunications link in the telecommunications network based on said determining whether the first user and the second user have the pre-existing, specified relationship to each other in the external and independent networked community of users, wherein said billing policy setting specifies a discounted rate charged by the telecommunications network to said first user for said telecommunications link in the telecommunications network when the first user and the second user have the pre-existing, specified relationship to each other in the external and independent networked community of users.

2. The method according to claim 1 wherein the request from the first user includes a Mobile Subscriber ISDN Number (MSISDN) identifier for the second user in the telecommunications network.

3. The method according to claim 1 wherein the request from the first user comprises a message transmission request for transmission of a message to the second user in the telecommunications network.

4. The method according to claim 1 wherein specifying at least one billing policy setting for the telecommunications link comprises specifying a billing rate for the telecommunications link.

5. The method according to claim 1 further comprising:
storing said relationship data received from said server hosting the external and independent networked community of users in a cache of the telecommunications network.

6. The method according to claim 5, wherein said analyzing step comprises querying said relationship data stored in said cache of the telecommunications network to determine whether the first user and the second user have the specified relationships to each other in the external and independent networked community of users.

7. The method according to claim 1 wherein the telecommunications link comprises a message transmission path.

8. The method according to claim 1 wherein the telecommunications link comprises a voice or data link.

9. The method according to claim 1 wherein the telecommunications network comprises an internetwork.

10. The method according to claim 1 further comprising:
receiving over the telecommunications network a request from the first user to form a specified relationship with a third user in the external and independent networked community of users, the request including an identifier of the third user; and transmitting, from the telecommunication network to said remote server hosting the networked community of users, a relationship request message to request establishment of a specified relationship in the external and independent networked community of users, the relationship request message including an identifier of the first user and an identifier of the third user.

11. The method according to claim 10 wherein the identifier of the first user and the identifier of the third user comprise identifiers in the telecommunications network.

12. The method according to claim 10 wherein the identifier of the first user and the identifier of the third user comprise identifiers in the external and independent networked community of users.

13. The method according to claim 1 further comprising providing at the remote server an application for managing communication with the telecommunications network.

14. The method according to claim 13, further comprising:
receiving at the application in the remote server a request from the first user to form a specified relationship to a third user in the external and independent networked community of users, the request including an identifier of the third user; and storing in the remote server an identifier of the first user and the identifier of the third user as a specified relationship in the external and independent networked community of users.

15. The method according to claim 14 wherein the request from the first user to form a specified relationship to a third user in the external and independent networked community of users is received from the social group platform.

16. The method according to claim 14 wherein the request from the first user to form a specified relationship to a third user in the external and independent networked community of users is received from the telecommunications network.

17. An apparatus for providing a telecommunications link between a first user and a second user in a telecommunications network, the apparatus comprising:
an input interface in the telecommunications network for receiving a call setup connection request from the first user to provide a telecommunications link to the second user over the telecommunications network, the telecommunications network being a mobile telephone network to which the first and second users are subscribers;

a microprocessor and a memory; and one or more server in said telecommunication network operating on said microprocessor and memory, wherein said one or more server is configured to,
determine, based on information from a remote server hosting an external and independent networked community of users in which users interact over a social group platform external to and independent of the telecommunications network whether the first user and the second user have a pre-existing specified relationship to each other in the external and independent networked community of users by,
sending a request from the telecommunications network to said remote server, wherein said request includes an identifier of the first user and an identifier of the second user,
receiving relationship data from said remote server responsive to said request, and
analyzing said relationship data received from said remote server to determine whether the first user and the second user have the pre-existing, specified relationship to each other in the external and independent networked community of users,
establish the telecommunications link in the telecommunications network between the first user and the second user; and
specify a billing policy setting for the telecommunications link based on whether the first user and the second user have the pre-existinq, specified relationship to each other in the external and independent networked community of users wherein said billing policy setting specifies a discounted rate charged by the telecommunications network to said first user for said telecommunications link in the telecommunications network when the first user and the second user have the pre-existing, specified relationship to each other in the external and independent networked community of users.

18. A non-transitory computer readable storage medium comprising instructions stored thereon which, when executed by a computer, cause the computer to perform steps comprising:
receiving in the telecommunications network, a call setup connection request from the first user to provide a telecommunications link to the second user over the telecommunications network, the telecommunications network being a mobile telephone network to which the first and second users are subscribers;
determining, based on information from a remote server hosting an external and independent networked community of users in which users interact over a social group platform external to and independent of the telecommunications network whether the first user and the second user have a pre-existinq, specified relationship to each other in the external and independent networked community of users, wherein said determining comprises,
sending a request from the telecommunications network to said remote server, wherein said request includes an identifier of the first user and an identifier of the second user,
receiving, at the telecommunication network, relationship data from the remote server responsive to said request, and
analyzing, in the telecommunications network, said relationship data received from the remote server to determine whether the first user and the second user have the pre-existing, specified relationship to each other in the external and independent networked community of users;
establishing the telecommunications link in the telecommunications network between the first user and the second user; and
specifying a billing policy setting for the telecommunications link based on whether the first user and the second user have the pre-existinq, specified relationship to each other in the external and independent networked community of users wherein said billing policy setting specifies a discounted rate charged by the telecommunications network to said first user for said telecommunications link in the telecommunications network when the first user and the second user have the pre-existing, specified relationship to each other in the external and independent networked community of users.

19. The method according to claim 1 wherein the specified relationship between the first and second users is specified by a third party administrator that establishes the external and independent networked community of users and includes the first and second user in the external and independent networked community of users.

20. The method according to claim 19 wherein the billing policy setting establishes that a charge for the telecommunications link is paid from a wallet associated with the external and independent networked community of users and not by the first or second users.

* * * * *

UNITED STATES PATENT AND TRADEMARK OFFICE
CERTIFICATE OF CORRECTION

PATENT NO. : 9,641,345 B2  
APPLICATION NO. : 13/148652  
DATED : May 2, 2017  
INVENTOR(S) : Jason Cross et al.

Page 1 of 1

It is certified that error appears in the above-identified patent and that said Letters Patent is hereby corrected as shown below:

In the Specification

In Column 22, Line 4, Delete "of the of the" and insert -- of the --, therefor.

In Column 32, Line 3, Delete "of the of the" and insert -- of the --, therefor.

In the Claims

In Column 53, Line 20, In Claim 17, delete "-existinq," and insert -- -existing, --, therefor.

In Column 54, Line 1, In Claim 18, delete "-existinq," and insert -- -existing, --, therefor.

In Column 54, Line 23, In Claim 18, delete "-existinq," and insert -- -existing, --, therefor.

Signed and Sealed this  
Eighteenth Day of June, 2019

Andrei Iancu  
*Director of the United States Patent and Trademark Office*